(12) United States Patent
Chopra et al.

(10) Patent No.: US 8,397,311 B2
(45) Date of Patent: Mar. 12, 2013

(54) METROLOGY PROBE AND METHOD OF CONFIGURING A METROLOGY PROBE

(75) Inventors: Harsh Deep Chopra, Williamsville, NY (US); Jason N. Armstrong, Groton, NY (US); Zonglu Hua, Williamsville, NY (US)

(73) Assignee: The Research Foundation of State University of New York, Amherst, NY (US)

( * ) Notice: Subject to any disclaimer, the term of this patent is extended or adjusted under 35 U.S.C. 154(b) by 0 days.

(21) Appl. No.: 13/322,568

(22) PCT Filed: May 28, 2010

(86) PCT No.: PCT/US2010/036714
§ 371 (c)(1),
(2), (4) Date: Jan. 11, 2012

(87) PCT Pub. No.: WO2010/138904
PCT Pub. Date: Dec. 2, 2010

(65) Prior Publication Data
US 2012/0110707 A1    May 3, 2012

Related U.S. Application Data

(60) Provisional application No. 61/181,840, filed on May 28, 2009.

(51) Int. Cl.
*G01Q 10/02* (2010.01)
*G01Q 10/04* (2010.01)
*G01N 23/00* (2006.01)

(52) U.S. Cl. .............. 850/2; 850/3; 250/306; 250/307; 73/105

(58) Field of Classification Search ............... 850/1–3, 850/8, 10, 14, 15, 18, 25, 26, 32, 33, 40, 850/46, 48; 250/306, 307, 310; 73/104, 73/105
See application file for complete search history.

(56) References Cited

U.S. PATENT DOCUMENTS

| | | | |
|---|---|---|---|
| 2003/0081651 A1* | 5/2003 | Gianchandani et al. | 374/185 |
| 2004/0232321 A1* | 11/2004 | Miles et al. | 250/235 |
| 2006/0027739 A1* | 2/2006 | Warren et al. | 250/234 |
| 2006/0123895 A1 | 6/2006 | Lee et al. | |
| 2008/0134771 A1 | 6/2008 | Schimmel et al. | |
| 2009/0072171 A1 | 3/2009 | So et al. | |
| 2010/0128342 A1* | 5/2010 | Abramovitch | 359/325 |

FOREIGN PATENT DOCUMENTS

| | | |
|---|---|---|
| JP | 2004028991 A | 1/2004 |
| KR | 1020060065466 A1 | 6/2006 |

* cited by examiner

*Primary Examiner* — Bernard E Souw
(74) *Attorney, Agent, or Firm* — Hodgson Russ LLP

(57) ABSTRACT

A metrology probe capable of measurements of a broad range of physical properties of individual samples of nano- or sub-nanometer dimensions is provided. The probe comprises a probe body, a substrate connected to the probe body, and a tip proximate the substrate. The probe further comprises a coarse piezoelectric actuator having an electrical input. The coarse piezo is configured to cause the tip and/or the substrate to move relative to each other when a first electrical signal is provided to the electrical input. The probe further comprises a low-pass filter in electrical communication with the electrical input of the coarse piezo. The probe further comprises a fine piezoelectric actuator having an electrical input configured to cause the tip and/or the substrate to move relative to each other when a second electrical signal is provided to the electrical input.

28 Claims, 21 Drawing Sheets

Frequency Response

Successive Elimination of Mechanical Vibrations

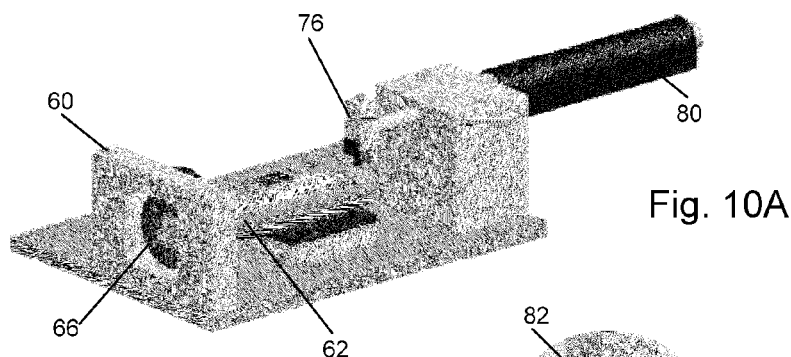
Fig. 10A
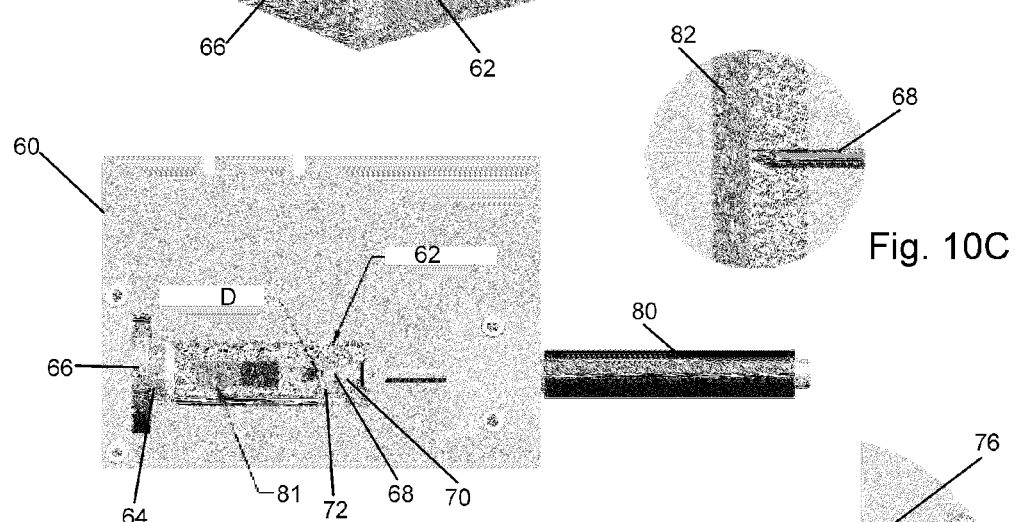
Fig. 10C
Fig. 10B
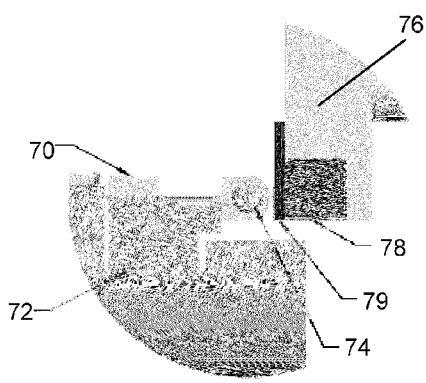
Fig. 10E
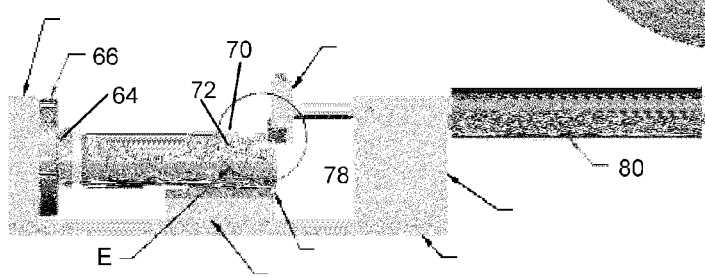
Fig. 10D Tip Approach Methodology

METROLOGY PROBE AND METHOD OF CONFIGURING A METROLOGY PROBE

CROSS-REFERENCE TO RELATED APPLICATION

This application claims the benefit of priority to U.S. provisional patent application Ser. No. 61/181,840, filed on May 28, 2009, the disclosure of which is incorporated herein by reference.

FIELD OF THE INVENTION

The invention relates to metrology, and more specifically to probes useful for measuring properties of materials.

BACKGROUND OF THE INVENTION

The measurement of the physical properties of a material with nano- or sub-nanometer dimensions (hereon referred to as "point contacts") is non-trivial. With smaller dimensions such measurements become progressively more difficult due to several complicating factors including: (a) weak signal from small samples; (b) inadequate signal-to-noise ratio; (c) parasitic noise (electrical and mechanical); (c) uncertainty in sample composition; (d) large fluctuations in signal even with small variations in temperature, pressure, humidity, contamination, etc.; (e) sample stability; (f) lack of universally acceptable standards for the measured physical property; and (g) traceability, etc. Moreover, in many instances, a method or instrumentation may not even exist for measurement of a particular physical property of samples with atomic-sized dimensions.

Point contacts can be made using a variety of methods. These include many variations of the so-called mechanical controlled break junction ("MCBJ") method and scanning tunneling microscopy ("STM"), both of which utilize piezoelectric actuators ("piezos") to close a gap between two opposite surfaces (herein referred to as a "tip" and a "substrate"). Other methods include the use of piezos, stepper motors, screw assemblies, and/or other moving mechanical parts to form a point contact between the tip and the substrate. Point contacts may also be formed by electrodeposition between two electrodes or electropolishing a fine wire.

However, there are problems with the existing conventional approaches. MCBJ-type methods, in which no one-to-one relationship between the displacement of the piezo and the movement of the tip relative to the substrate, suffer from parasitic mechanical and/or electrical noise. This results in producing an unstable point contact wherein the size is difficult to control, requiring separate calibration when a new tip is used, and involving inexact equations for determining displacement. In addition, the use of intermediate materials to support the displacement between tip and substrate in MCBJ-type methods may suffer from time-dependent or time-independent elastic/plastic behavior inherent in all materials, which also varies with temperature, thereby altering the displacement in a way that is difficult to predict.

Moreover, noise in the signal driving the piezo actuator in MCBJ, STM, or other similar methods causes the piezo to cause small changes in its shape. Although the variations in shape of the piezo are small, at the atomic scale they are large enough to make a point contact unstable—varying uncontrollably in size. Another drawback is the possible existence of drift in the signal driving the piezo, which has a similar effect. For example, FIGS. 1A and 1B show a gold point contact made by a MCBJ-type method, which suffers from uncontrollable change in size due to parasitic mechanical vibrations resulting from inadequate isolation. In this example, an approximately 50-atom gold point contact was formed at time t=0 s (FIG. 1A). The magnified view of the conductance trace (insets to FIG. 1A) show the presence of parasitic mechanical vibrations that causes the contact size to vary uncontrollably. FIG. 1B shows the Fourier transform of the conductance trace, which reveals the presence of mechanical vibrations of different amplitude and frequency.

The use of stepper motors, screw assemblies, moving mechanical parts, or straightforward use of piezos leads to similar mechanical and/or electrical noise as described above resulting in a lack of control over the size of point contacts.

Electrodeposition or electropolishing techniques are useful but limited to a narrow set of applications over a small range of temperature.

Overall, achieving stable point contacts free from parasitic mechanical and electrical interference, for measurement of a broad range of physical properties under different perturbations is complicated, imprecise, and has been difficult to integrate in one versatile system.

BRIEF SUMMARY OF THE INVENTION

A metrology probe capable of measurements of a broad range of physical properties of individual samples of nano- or sub-nanometer dimensions is provided. The probe comprises a probe body and a substrate connected to the probe body. The substrate may be constructed from the material to be measured. The substrate may be held in a substrate holder, and the substrate holder may be connected to a substrate mount. The probe further comprises a tip connected to the probe body. The tip may be affixed to tip holder, which in turn is connected to the probe body by a tip mount. The tip has a tip end proximate to the substrate.

The probe further comprises a coarse piezoelectric actuator (hereinafter a "piezo") having an electrical input. The coarse piezo is configured to cause the tip and/or the substrate to move relative to each other when a first electrical signal is provided to the electrical input. The probe further comprises a low-pass filter in electrical communication with the electrical input of the coarse piezo to remove substantially all non-D.C. components of the first electrical signal. The probe further comprises a fine piezoelectric actuator having an electrical input. Similar to the coarse piezo, the fine piezo is configured to cause the tip and/or the substrate to move relative to each other when a second electrical signal is provided to the electrical input. The fine piezo differs from the coarse piezo in that the fine piezo will cause less movement for a given electrical signal than the coarse piezo. More than one of each piezo (coarse and fine) may be used.

The present invention may be embodied as a method of configuring a metrology probe comprising the step of providing a pushing assembly having an actuator and a magnet. A probe body is provided adjacent to the pushing assembly, the probe body including a substrate and a tip mount. A tip holder, having a tip affixed therein, is placed in the tip mount of the probe body such that the tip is proximate the substrate and the tip holder is held against the pushing assembly by the magnet of the pushing assembly. The actuator is used to move the tip toward the substrate by a predetermined distance. A parameter of the tip and substrate is measured to determine a distance from the tip to the substrate. The steps of using the actuator to move the tip and measuring the tip-substrate parameter are repeated until a desired tip-substrate distance is determined. Once the desired tip-substrate distance is determined, the tip holder is affixed to the tip mount of the probe body.

The present invention may be embodied as a method of measuring a physical property of a material comprising the step of providing a measurement apparatus having a tip proximate to the material to be measured, providing a first electrical signal to an electrical input of a coarse piezo of the probe to cause the tip and/or the material to move relative to each other such that the tip and material are closer to each other, providing a second electrical signal to an electrical input of a fine piezo of the probe to cause the tip and/or the material to move relative to each other, and using the tip to measure a property of the material.

The method may further comprise providing a coarse piezo affixed to the probe body and configured to move the substrate and/or the tip relative to each other. For each use of the pushing assembly actuator (described above) to move the tip holder, the coarse piezo is used to move the substrate and/or the tip relative to each other by a predetermined second distance. The tip-substrate parameter is measured to determine the tip-substrate distance. The steps of using the coarse piezo and measuring the tip-substrate parameter are repeated until a desired tip-substrate distance is determined or until the coarse piezo has reached a maximum range of motion (maximum usable length).

The device presently described is a metrology system that is useful for academic and industrial research in a broad range of fields from physics, chemistry, biology, engineering, and materials science, metrology, nanoscience & nanotechnology, molecular electronics & mechanics, bio-mechanics, tribology, etc.

The device is capable of measuring a broad range of physical properties including electrical, mechanical, tribological, molecular electronics, quantum electronics, bio-mechanical, magnetoelectronics, magnetoresistive, etc. An integrated measurement system includes vibration and noise elimination features, custom electronics, variable temperature, pressure, force, strain, magnetic or electric fields, environment (gaseous or liquid), probe alignment assembly, different probes, custom software, and real-time data acquisition and processing capabilities. A system of the present invention offers many advantages, including versatility, mechanical vibration isolation, enhanced stability through the use of multiple piezoelectric actuators, enhanced stability through matched coefficients of thermal expansion, simplified design through pre-alignment of probe, real-time noise analysis, ease of manufacturability, robust signals from atomic-sized samples, high signal-to-noise ration, small parasitic noise (electrical and mechanical), certainty in sample composition, controlled environment (temperature, pressure, humidity, etc.), high sample stability, modular.

DESCRIPTION OF THE DRAWINGS

For a fuller understanding of the nature and objects of the invention, reference should be made to the following detailed description taken in conjunction with the accompanying drawings, in which:

FIG. 3C is a perspective view of a magnetic alignment assembly of the probe of

FIGS. 3A and 3B;

FIG. 10A is a perspective view of a probe alignment assembly and a probe of the present invention;

FIG. 10B is a top view of the probe alignment assembly and a probe of FIG. 10A;

FIG. 10C is a detail view of the region labeled D of FIG. 10B;

FIG. 10D is a side view of the probe alignment assembly and a probe of FIGS. 10A and 10B;

FIG. 10E is a detail view of the region labeled E of FIG. 10D;

DETAILED DESCRIPTION OF THE INVENTION

Figure 2A:
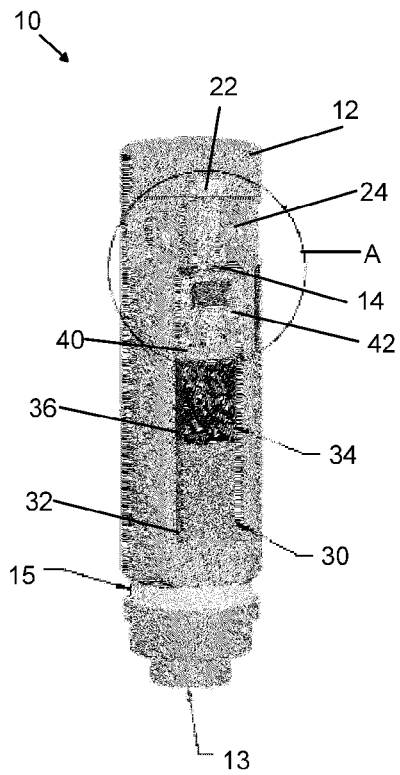
FIG. 2A is a perspective view of a probe according to an embodiment of the present invention.
Figure 2B:
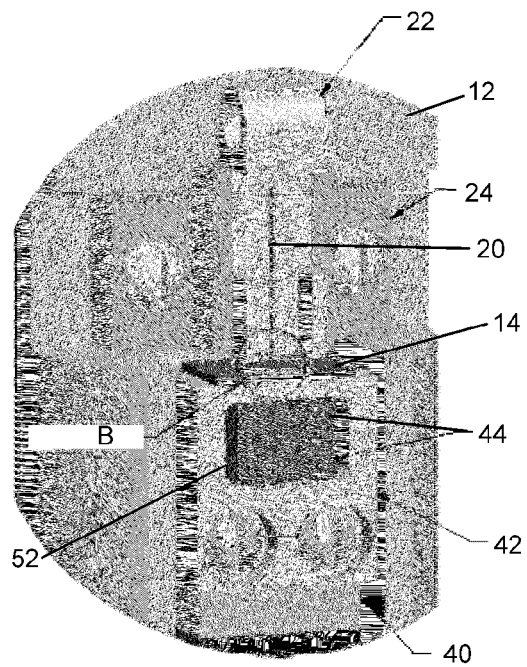
FIG. 2B is a detail view of the region labeled A of FIG. 2A.
Figure 2C:
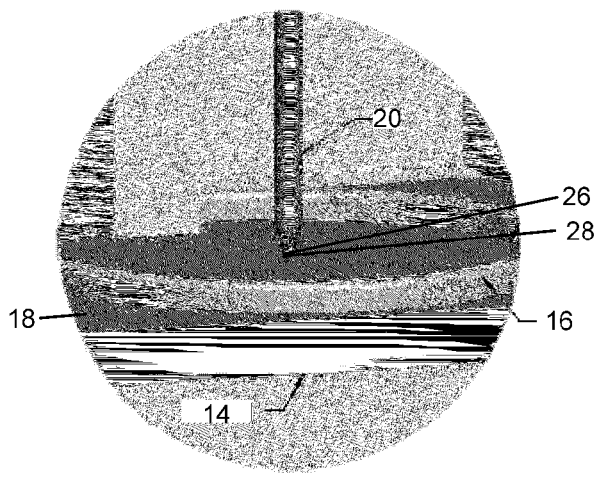
FIG. 2C is a detail view of the region labeled B of FIG. 2B.

FIGS. 2A-2C depicts a metrology probe 10 capable of measurements of a broad range of physical properties of individual samples of nano- or sub-nanometer dimensions according to an embodiment of the present invention. The probe 10 comprises a probe body 12 which may be constructed from a non-reactive metal such as, for example, titanium (further discussion of material selection is below). The probe 10 further comprises a substrate 14 connected to the probe body 12. The substrate 14 has a top surface 18. The substrate 14 may be constructed from the material to be measured. In another embodiment, the material to be measured is a liquid and a retainer, such as, but not limited to, retaining ring 16, is disposed on the top surface 18 of the substrate 14 to contain the liquid. In another embodiment, the substrate 14 could be shaped in a form suitable for containing a liquid, such as a dish. The substrate 14 may be held in a substrate holder 42. The substrate holder 42 may be connected to a substrate mount 40.

The probe 10 further comprises a tip 20 connected to the probe body 12. In the embodiment depicted in FIGS. 2A-2C, the tip 20 further comprises a tip holder 22. The tip 20 may be affixed to tip holder 22 which in turn is connected to the probe body 12 by a tip mount 24. The tip 20 has a tip end 26 proximate to the substrate 14. The tip end 26 may be configured to form a point 28. The point 28 may be as small as a single atom in diameter (e.g., 0.35 angstroms for gold). The tip 20 may be constructed of, for example, gold, platinum, cobalt, and the like. The tip 20 and the substrate 14 may have any geometry and may be composed of the same material or different materials. For example, instead of a flat substrate 14 and a pointed tip 20, one may use two pointed structures (tip and substrate) opposite each other, depending on the application.

The probe 10 further comprises a coarse piezoelectric actuator 30 having an electrical input 32. Generally speaking, a piezo will change shape depending on an electrical signal received at the electrical input of the piezo. In the present case, the coarse piezo 30 is configured to cause the tip 20 and/or the substrate 14 to move relative to each other when a first electrical signal is provided to the electrical input 32. In other words, the coarse piezo 30 is configured to cause the tip 20 and/or the substrate 14 to move closer or further from each other. As such, the coarse piezo 30 may be located between the tip 20 and the probe body 12 to cause the tip 20 to move nearer or further from the substrate 14. Alternatively, the coarse piezo 30 may be located between the substrate 14 and the probe body 12 to cause the substrate 14 to move nearer or further from the tip 20. In yet another configuration, two coarse piezos 30 may be used to move both the tip 20 and the substrate 14 nearer and further from each other.

The probe 10 further comprises a fine piezoelectric actuator 34 having an electrical input 36. Similar to the coarse piezo 30 described above, the fine piezo 34 is configured to cause the tip 20 and/or the substrate 14 to move relative to each other when a second electrical signal is provided to the electrical input 36. The fine piezo 34 differs from the coarse piezo 30 in that the fine piezo 34 will cause less movement for a given electrical signal (further detailed below).

The coarse and fine piezos 30, 34 may be capable of independent motion along the X-, Y-, and/or Z-axis. For example, individual piezoelectric actuators capable of multiple degrees of freedom may be selected. In another embodiment, more than one of each piezo (coarse and fine) may be used to allow for movement in more than one dimension.

The probe 10 further comprises a low-pass filter 38 in electrical communication with the electrical input 32 of the coarse piezo 30. In this way, the first electrical signal is filtered by the low-pass filter 38 to remove substantially all non-D.C. components of the first electrical signal. As such, the filtered electrical signal provided to the coarse piezo 30 is substantially free of electrical noise. This results in substantially no undesired movement of the coarse piezo 30 and, thereby, no undesired movement of the tip 20 and/or substrate 14 due to the coarse piezo 30.

A probe of the present invention can be configured in different ways, depending on specific applications and needs. For example, the coarse piezo could be mounted below the substrate and the fine piezo behind the tip, or vice versa. One such probe 11 is depicted in FIGS. 3A-3E. Such a probe 11 is suited for measurement of mechanical properties of small systems requiring elongation of the point contacts and measurement of forces at the same time, tribology, (bio) molecular mechanics, etc. in conjunction with other physical properties under different perturbations. The probe 11 is shown with (FIG. 3A) and without (FIG. 3B) a cover 46. The cover 46 may be used for introduction of inert or other gases during experiments via a port 96. FIG. 3E depicts an embodiment wherein the tip 30 is a cantilever tip. The deflection of such a cantilever tip may be measured by, for example, optical methods or others methods known in the art. Such a probe 11 may be used as an atomic force microscope.

The use of multiple piezos (coarse and fine) to make point contacts between the tip 20 and the substrate 14 allows for stable formation of point contacts by the reduction of noise. Specifically, by filtering noise from the first electrical signal, the coarse piezo 30 provides a stable platform by which the fine piezo 34 is able to make fine adjustments to the tip 20 and/or substrate 14 position. Though noise may be present in the second electrical signal (provided to the electrical input of the fine piezo 34), the noise will have substantially smaller impact due to the resulting smaller movement of the fine piezo.

To illustrate the use of multiple peizos, consider a coarse and fine piezo capable of displacement along the X-axis. Relative to a fine piezo, the characteristics of a coarse piezo is a larger displacement for the same driving voltage. In a non-limiting example, a 10 V signal, with a 10 mV noise applied to a coarse piezo with sensitivity of 100 nm/V would cause it displace to 1000 nm (1 μm) with 1 nm of uncertainty in its position. In contrast, the same voltage applied to a fine piezo with a sensitivity of 1 nm/V would cause it to displace by 10 nm with 0.01 nm (10 picometer) of uncertainty in its position. Given the fact that a metrology system using a probe of the present invention is intended to measure physical properties of systems as small as a single atom (~0.1 nm), a coarse piezo alone would be unsuitable in meaningfully studying their properties because of a large uncertainty in its position. At the same time, the use of a fine piezo alone would also be insufficient because of limited displacement capabilities, and complications arising from alignment of the tip relative to the substrate at such small distances. Typically, to align a tip relative to a substrate, tip-to-substrate travel distances of a few microns are required. Also, travel distances for piezos at lower temperatures decrease significantly. For example, in typical piezos, the travel distances at cryogenic temperatures can decrease by as much as 90% of the travel at room temperature. Additionally, while embodiments are described having a coarse and a fine piezo, the present invention contemplates and is intended to cover the use of multiple piezos with successively more sensitivity (e.g., a coarse, medium, and fine piezo).

In use, the coarse piezo 30 is first used to close the gap between the tip 20 and the substrate 14, until a point contact of a preset size is formed, or the substrate 14 is brought to a desired distance from the substrate 14. (Note that, as previously stated, depending on the configuration of the probe, either the tip 20, the substrate 14, or both can be moved relative to each other). The electronics for the coarse piezo 30 electrical signal provide a low pass filtered signal with a very small cutoff frequency (~0.01 Hz). In effect, this makes the position of the coarse piezo 30 highly stable because the noise and the drift in the drive signal are significantly reduced. In effect, the coarse piezo 30 is essentially motionless. However, while this stability reduces the drift and the noise in the point contact, it also reduces the dynamic properties of the coarse piezo 30 that may be needed in probing various physical properties of the point contact. For example, in the measurement of load-deflection behavior of a metal point contact or the deformation properties of a single molecule, one may wish to oscillate the piezo at different frequencies. A low pass filtered signal with a cutoff frequency of, for example, ~0.01 Hz cannot be oscillated at a given amplitude faster than one time in hundred seconds, whereas typical experiments may warrant the piezo to oscillate from a few tens of Hz to several kHz or even higher. In these cases, the dynamic capabilities are provided by the fine piezo 34. As such, the fine piezo 34 can be oscillated to any arbitrarily high frequency for dynamical measurements. The fine piezo 34 may also be used to change the size of the point contact between the tip 20 and the substrate 14 at the picometer resolution to study various physical properties. The size of the sample can be varied from a single atom or a single molecule to larger dimensions.

Figure 4:
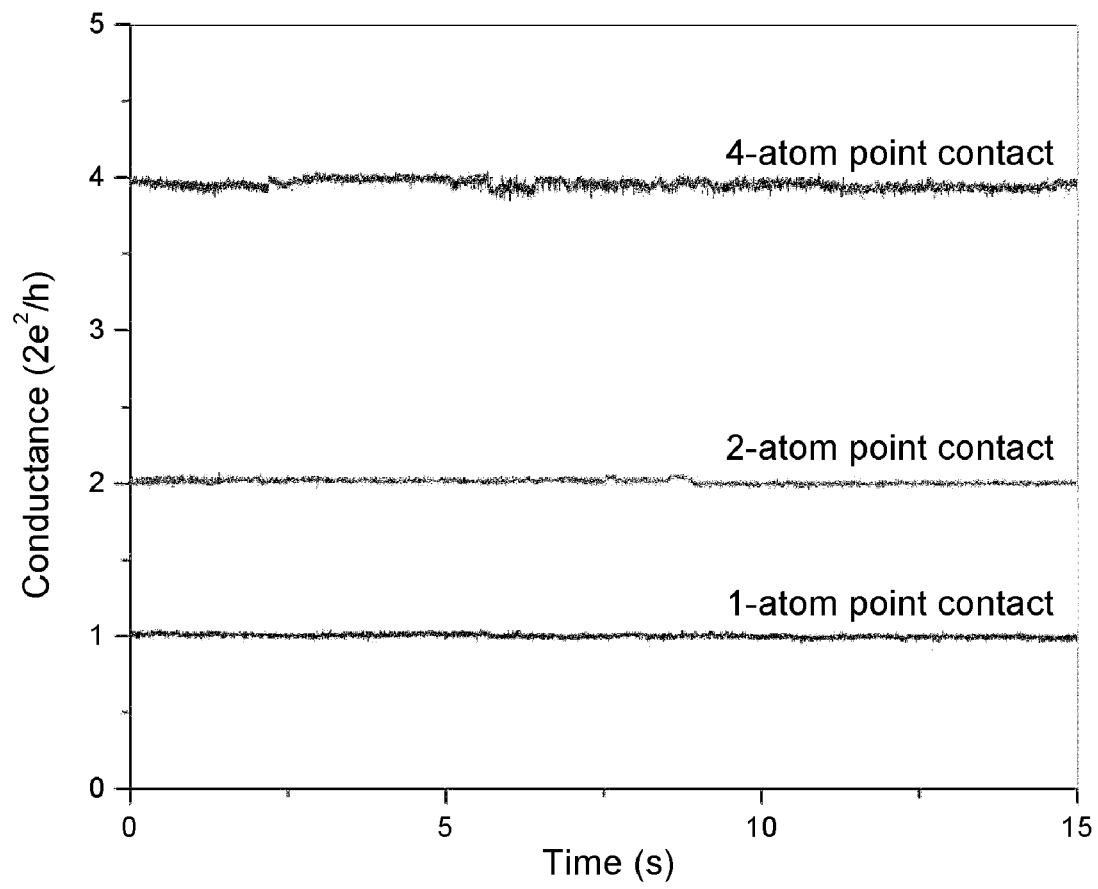
FIG. 4 is a graph of conductance over time for examples of highly stable, noise-free gold point contacts that are made of one, two, and four atoms using the system and method of the present disclosure.
Figure 5:
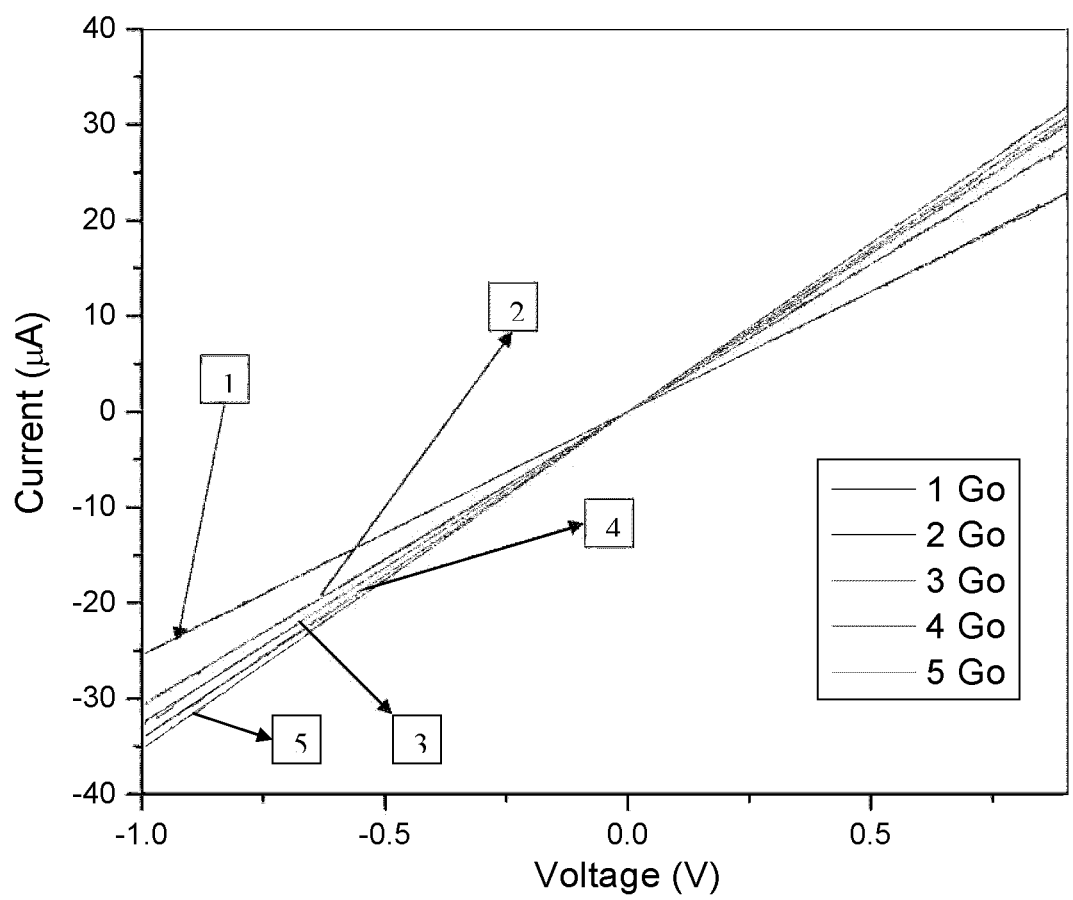
FIG. 5 is a graph showing examples of the measured I-V characteristics of gold point contacts that one, two, three, four, and five atoms in diameter using the system and method of the present disclosure.
Figure 6:
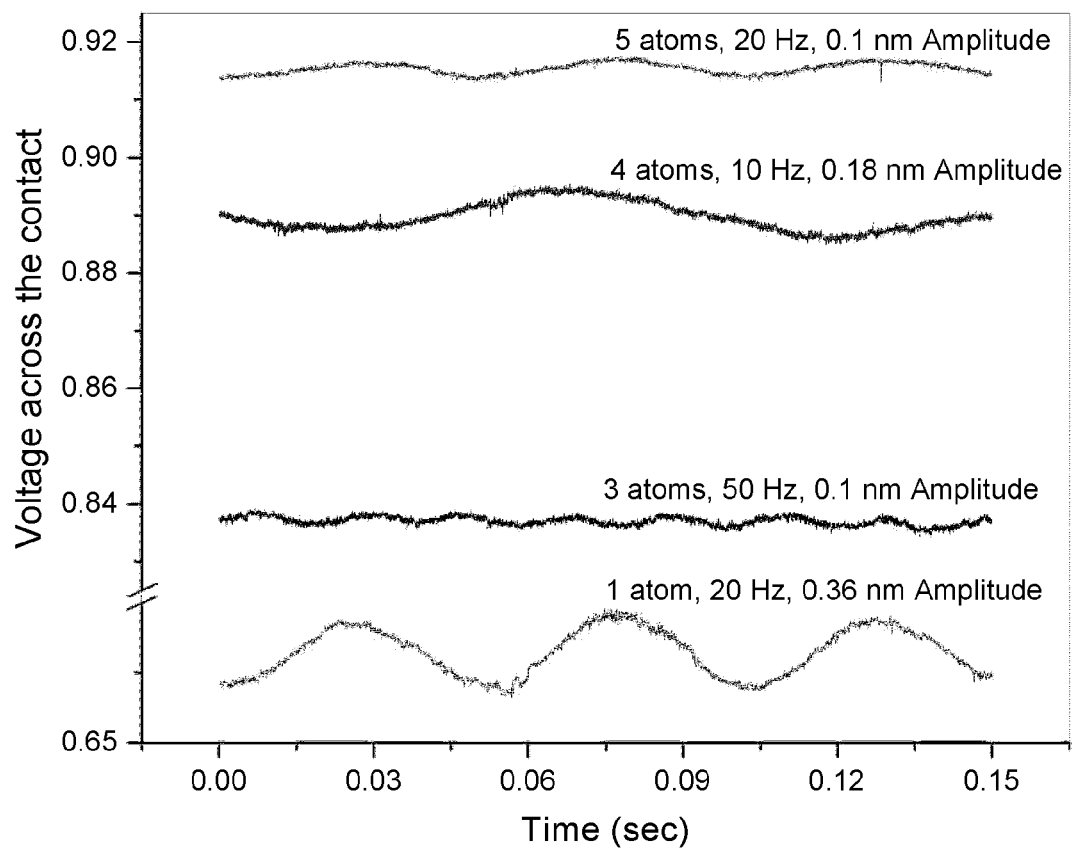
FIG. 6 is a graph showing examples of mechanical elongation of gold point contacts to various amplitudes and at different frequencies using the system and method of the present disclosure.

FIG. 4 shows examples of highly stable, noise-free gold point contacts that are made of just one, two, and four atoms using an embodiment of the present invention. Once a point contact of a desired size and shape is formed between the tip and the substrate, measurement of various physical properties may be accomplished. A probe of the present invention is capable of measuring a range of physical properties of nanometer scale materials as a function of temperature; pressure, force, or elongation; electric field; magnetic field; composition; or any combination thereof, and under different chemical environments (liquid, gaseous, etc.). For example, FIG. 5 shows an example of the measured I-V characteristics of gold point contacts that are one, two, three, four, and five atoms in diameter. FIG. 6 shows several examples of mechanical elongation of gold point contacts to various amplitudes and at different frequencies.

Figure 19:
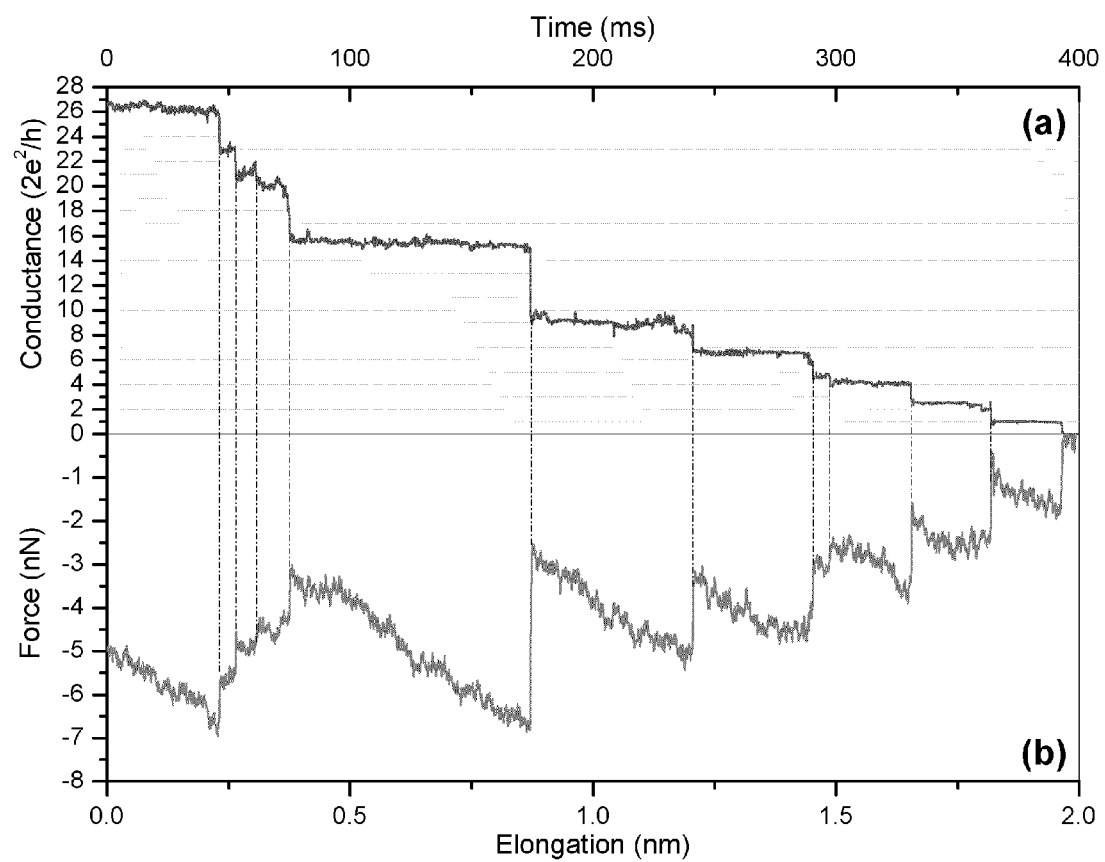
FIG. 19 is a graph showing the simultaneous measurement of (a) conductance and (b) force during the rupture of a gold constriction at room temperature using a probe of the present invention configured as an atomic force microscope ("AFM") cantilever, wherein the retraction speed of the AFM cantilever is 5 nm/s.
Figure 20:
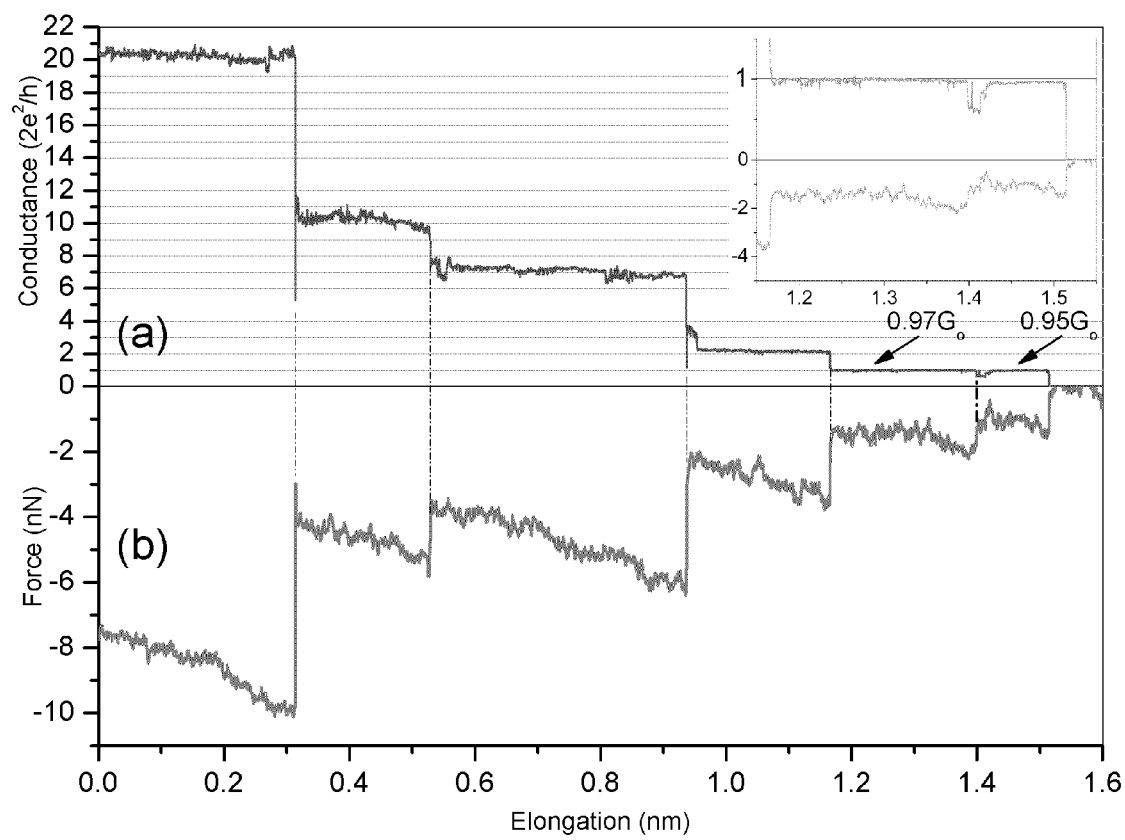
FIG. 20 is a graph showing (a) a conductance trace whose last conductance plateau is consistently below 1 $G_o$; and (b) the simultaneously measured force-elongation curve, wherein the inset in (a) shows details of the conductance trace and force-elongation curve for the plateau below 1 $G_o$ and wherein the retraction speed of the AFM cantilever is 5 nm/s.
Figure 21:
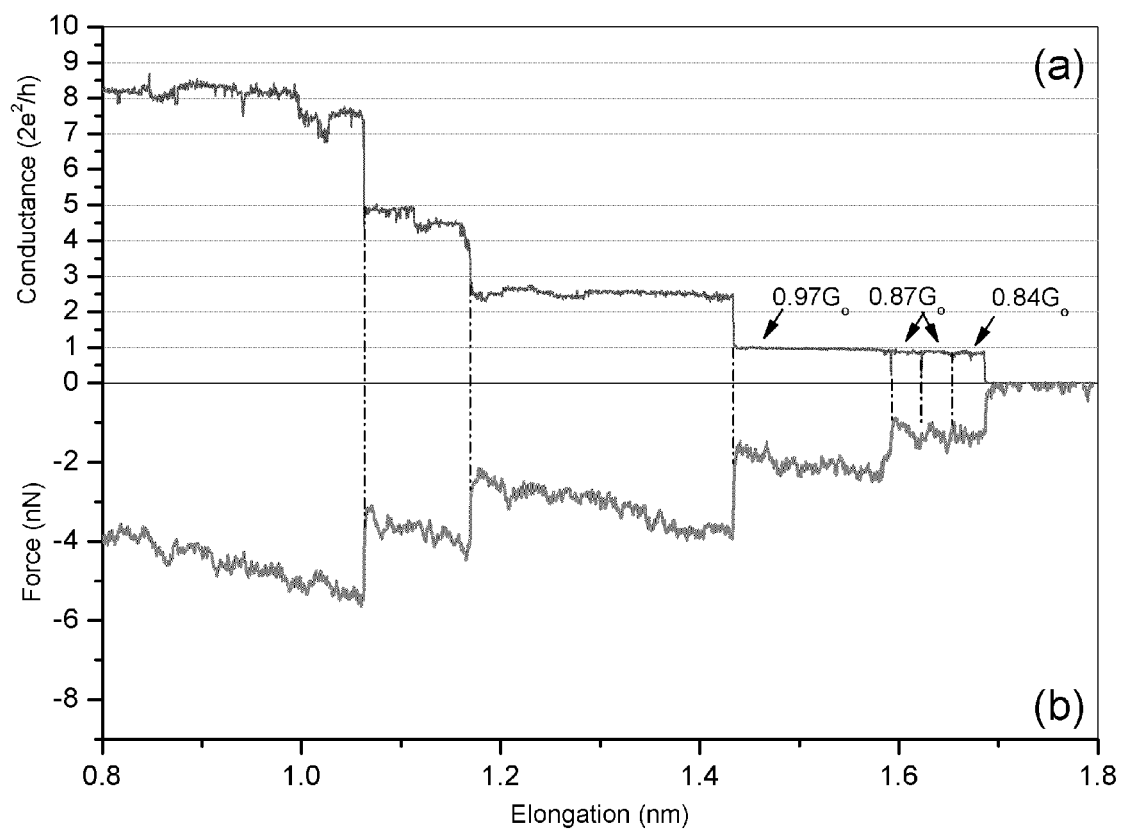
FIG. 21 is a graph showing (a) a conductance trace whose last conductance plateau is consistently below 1 $G_o$; and (b) the simultaneously measured force-elongation curve, wherein the retraction speed of the AFM cantilever is 5 nm/s.

When configured as an AFM module, the present invention may be used to measure, for example, force elongation data. FIGS. 19-21 show data obtained when testing a probe similar to that shown in FIGS. 3A-3E; these data are exemplary and are not intended to limit the invention. FIG. 19 is a graph showing the simultaneous measurement of (a) conductance and (b) force during the rupture of a gold constriction at room temperature. The retraction speed of the AFM cantilever of this (and the following examples) is 5 nm/s. FIG. 20 is a graph showing (a) a conductance trace whose last conductance plateau is consistently below 1 $G_o$; and (b) the simultaneously measured force-elongation curve. FIG. 20 also shows details of the conductance trace and force-elongation curve for the plateau below 1 $G_o$ (see inset). FIG. 21 is a graph showing (a) a conductance trace whose last conductance plateau is consistently below 1 $G_o$; and (b) the simultaneously measured force-elongation curve.

The probe 10 may further comprise components 44 to alter the testing environment. For example, the probe 10 may have a heating element for heating the substrate 14. Similarly, the probe 10 may have a cooling element for cooling, a magnet for introducing a magnetic field, or an oscillator for vibrating the substrate 14. Other components will be apparent to those having skill in the field. Such components may be used individually or in various combinations. The probe 10 may include a slot 52 for placing such components. In this way, components can be more readily added or removed depending on the desired test.

The probe 10 may include a mounting puck 13 for mounting the probe 10 in a probe chamber (such as, for example, the isolation system described below). The probe 10 may be configured such an electrical path is provided from the tip 20 to an electrical interface and from the substrate 14 to an electrical interface such that electrical measurements of properties between the tip 20 and the substrate 14 may be made by connecting measurement equipment to the electrical interface. The electrical path may be provided by using wires, using the probe body itself, using conductive paints and glues, and/or other techniques known in the art. The electrical interface may be provided near the mounting puck 13. The electrical interface may be the mounting puck 13 itself such that when the probe 10 is mounted using the mounting puck 13, electrical connections needed for measurement are made automatically. The probe 10 may include an insulator 15 between the mounting puck 13 and the probe body 12.

Another consideration of a probe of the present invention is the careful selection of the coefficient of thermal expansion of different parts of the probe. If various parts have a large mismatch in their coefficient of thermal expansion, the tip may retract away from or crash into the substrate due to contraction or expansion of different components, respectively, as the temperature is lowered. If the tip moves too far away from the substrate, coarse piezo travel may be insufficient, leading to abandoning of the experiment. Conversely, a tip that has impacted the substrate would have to be replaced. Through careful selection of materials and design of the probe, the tip can maintain essentially the same distance relative to the substrate at all temperatures. Such careful selection of materials with compatible coefficients of thermal expansion eliminates the use of moving mechanical parts, stepper motors, or other mechanisms to compensate for structural changes due to temperature.

Figure 1A:
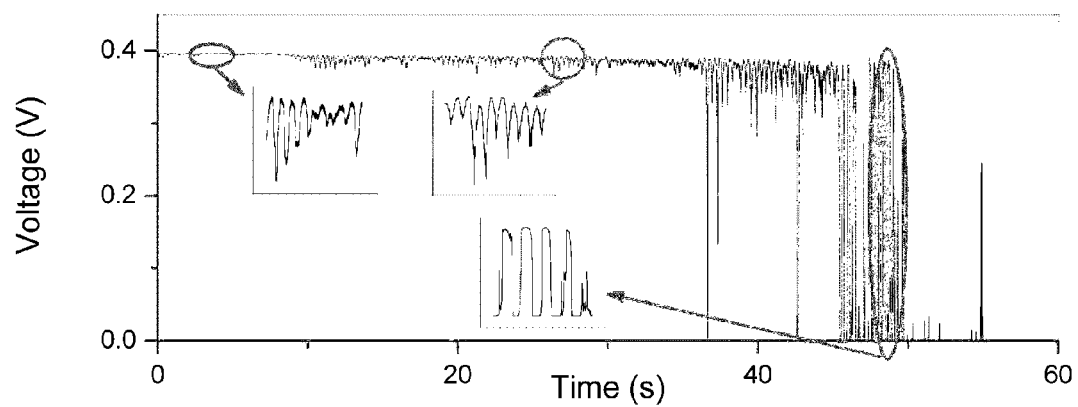
FIG. 1A is a graph of the Voltage over time of a gold point contact made by an MCBJ-type method of the prior art.
Figure 1B:
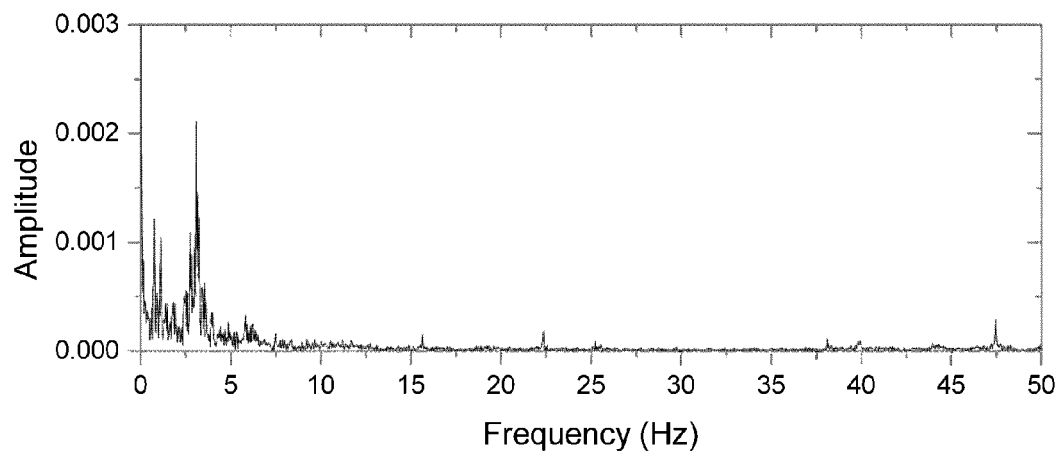
FIG. 1B is a graph of the frequency domain of the curve of FIG. 1A.

The small overall size of a probe according to the present invention enables insertion of the probe in various environments, such as, but not limited to, cryostats, vacuum chambers, solenoids for magnetic fields, custom gaseous environments, etc. Such experiments may be housed in the vibration isolation system. Isolation of the measurement signal from extraneous noises (electrical and mechanical) or other parasitic effects arising from uncontrolled variations in environment (e.g., temperature, humidity, contamination, etc.) should be a goal of all physical property measurement systems. However, such isolation becomes acutely important while performing measurements on atomic-sized point contacts. The ability to isolate an experiment from extraneous perturbations is a requirement for performing robust measurements on samples of atomic dimensions. Mechanical vibrations, electrical interference, thermal fluctuations, or even air currents can have devastating impact at these small scales. An example of the effect of uncontrolled mechanical vibrations is shown in FIG. 1.

Figure 7:
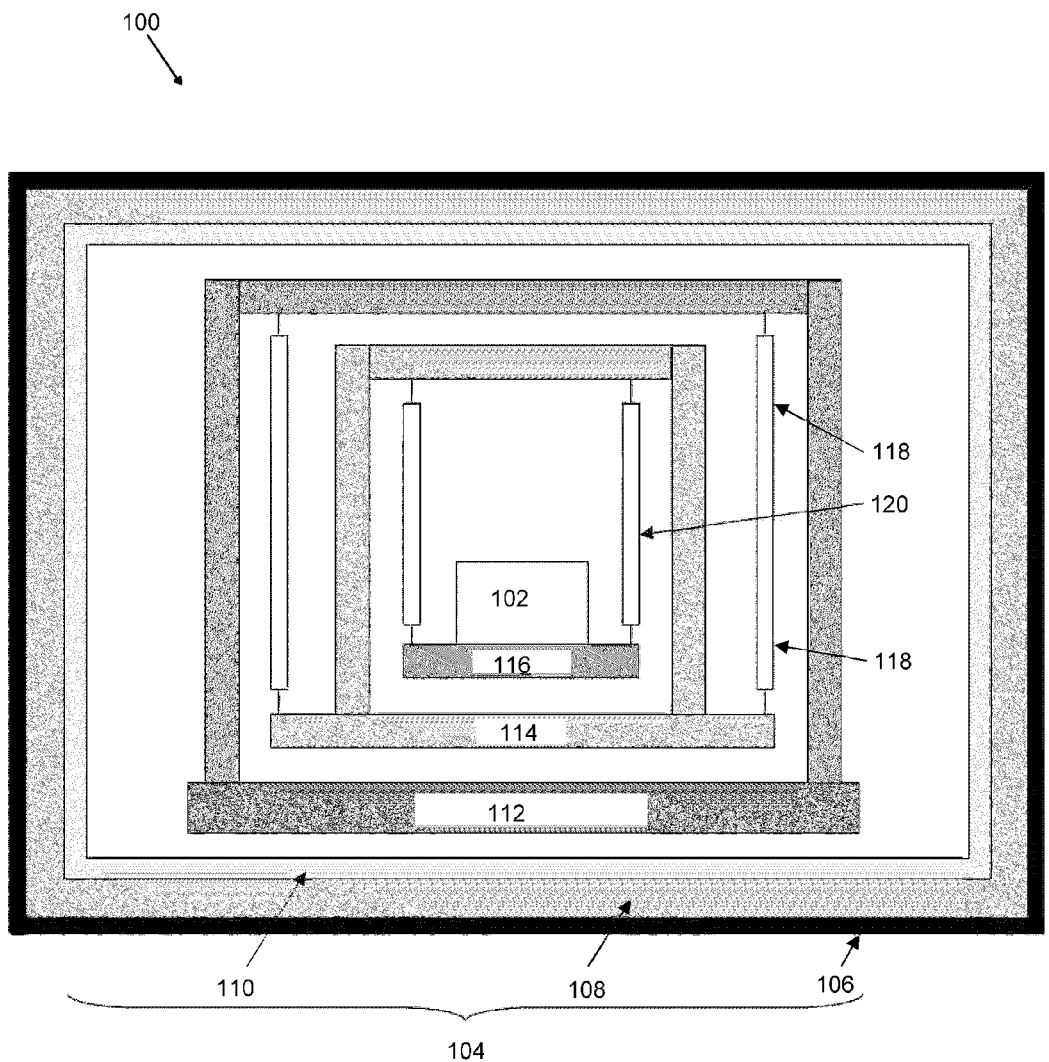
FIG. 7 is a schematic of an isolation system according to an embodiment of the present invention.

FIG. 7 shows a schematic of an isolation system 100 that can house a probe of the present invention within a probe chamber 102. Such an isolation system 100 comprises a main chamber 104 which may have a Faraday cage 106 which blocks electrical interference from generating parasitic noise in the electronic system. The Faraday cage 106 may be lined with thermal insulation 108 that helps maintain a constant temperature within the main chamber 104. At the small scale systems of interest in this disclosure, variations in ambient temperature can cause parts of a probe to expand or contract. While negligible in ordinary measurements, this can result in a drift of the distance between the tip and the substrate of the probe, resulting in uncontrolled variations in sample geometry. The main chamber also blocks any external air currents from entering and acoustic foam 110 lining the inside of the main chamber 104 may prevent sound waves from resonating inside.

Within the main chamber 104 is the vibration isolation system, which is comprised of an air table 112 and two suspension stages 114, 116. The air table 112 may be a stainless steel laminate platform mounted on pneumatic cylinders that act to cushion the platform. Mounted on the top of the air table 112 is a support structure from which the first suspension stage 114 (mass=m1) is suspended using a first spring damper system 118 (spring constant=k1, damping coefficient=c1). The second suspension stage 116 (m2) is then suspended from the first suspension stage 114 using a second spring damper system 120 (k2, c2). Mounted on the second suspension stage 116 is the probe chamber 102 which is capable of containing various probe assemblies. The probe chamber 102 can also be customized for a variety of applications. For example, the probe chamber 102 may include a heater to provide elevated temperatures, a cryogenic chamber for low temperature studies, or a solenoid to perform magnetic studies. The probe chamber 102 can also be under high vacuum or purged with the desired gaseous chemical environment. Note that, any number of stages may be needed to isolate vibrations.

Figure 8A:
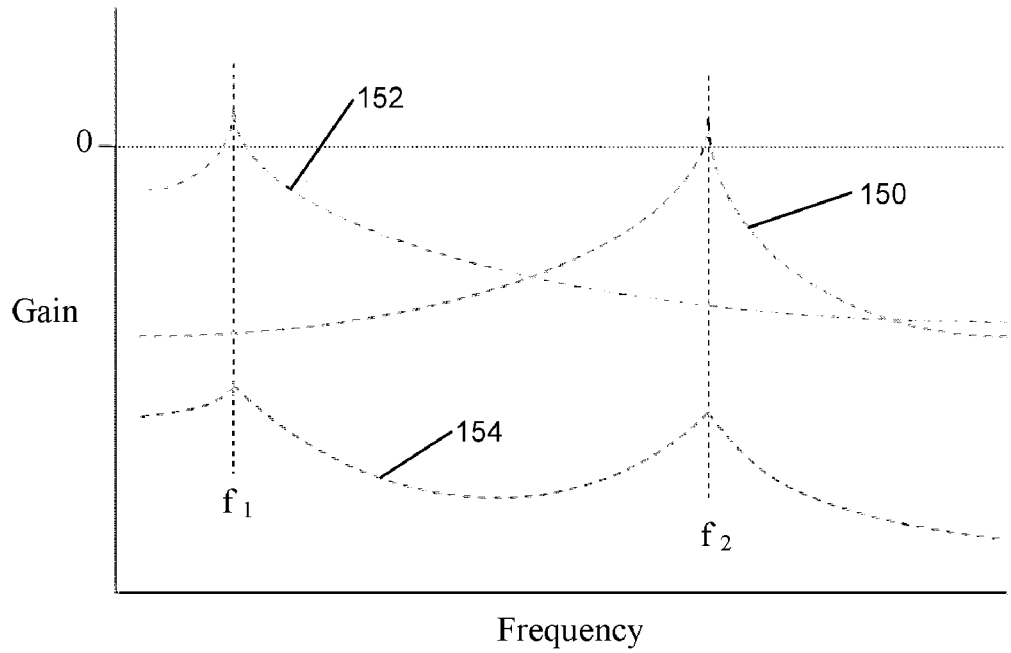
FIG. 8A is a graph showing an example of the frequency response for an isolation system and a probe.
Figure 8B:
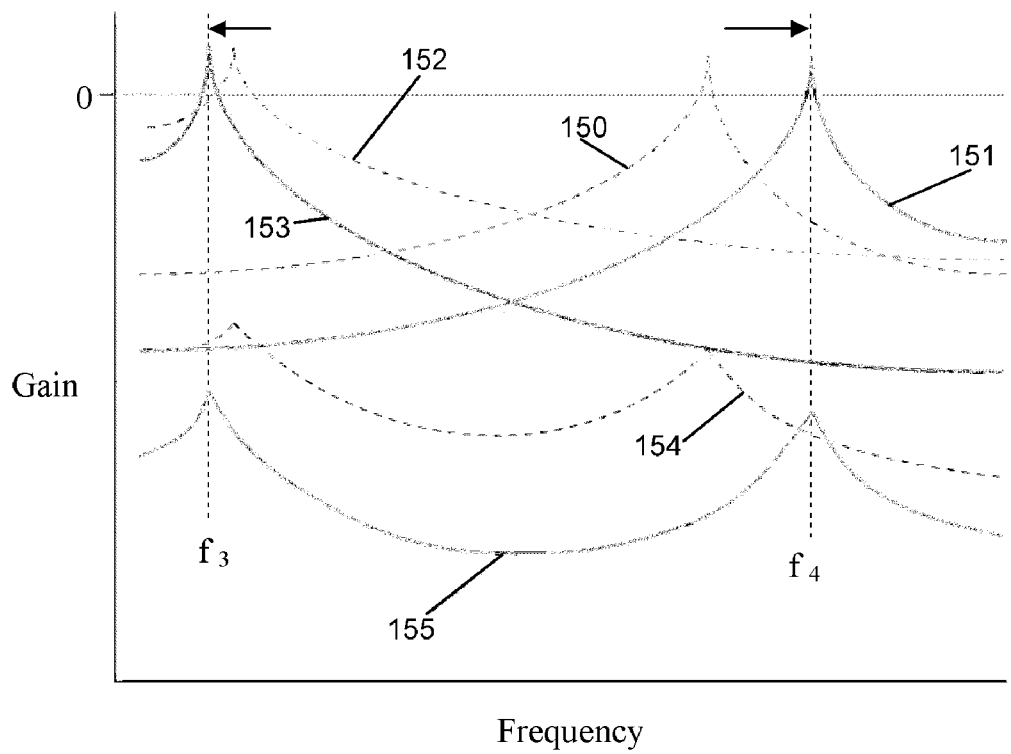
FIG. 8B is a graph showing an example of the frequency response of an isolation and probe where the system and probe have been optimized to reduce mechanical vibration in a system of the present invention.

Mechanical vibration isolation is an important component of such an isolation system 100. The purpose of the vibration isolation system is to act as a filter to the mechanical frequencies in the surrounding environment. The isolation curve 152 in FIG. 8A is an example of the frequency response for a given isolation system. At frequency f1 there is a peak which coincides with the natural frequency of the isolation system. At this frequency the amplitude of the vibrations will actually be amplified (gain>0) but to each side of this peak the vibrations will be suppressed (gain<0). The probe curve 150 is the frequency response of the probe assembly, which due to its rigid assembly has a much higher natural frequency, f2. The combined curve 154 is the combined response for the system, which should be made as small as possible for the best overall isolation from environmental vibration. In general, most of the mechanical vibrations will fall between frequencies f1 and f2 so it is this region specifically that needs to be made as low as possible and there are several ways to achieve this. Pushing f1 to a lower frequency and pushing f2 to a higher frequency will decrease the gain. Additionally, adding additional stages of isolation will make the drop-off on each side of f1 become steeper which will also decrease the gain. These methods were used to optimize the isolation system of the present invention and are illustrated in FIG. 8B (solid curves 151, 153, 155 corresponding to curves 150, 152, 154 respectively).

Figure 9A:
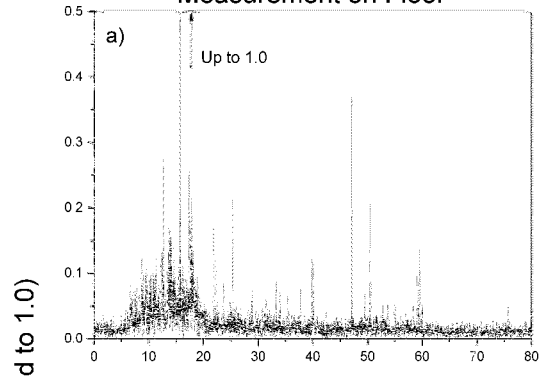
FIG. 9A is a graph showing a spectrum analysis of the frequencies that are present on the floor of a laboratory.
Figure 9B:
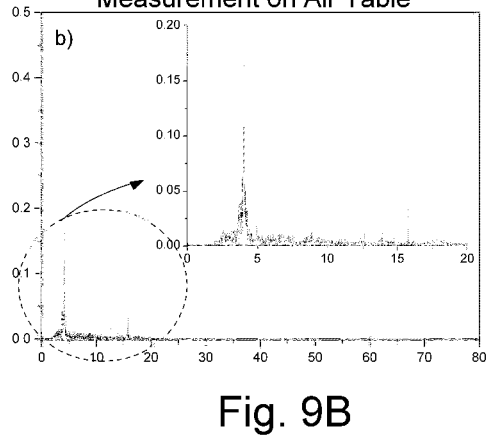
FIG. 9B is a graph showing a spectrum analysis of the frequencies that are present on an air table of an isolation system according to an embodiment of the present invention, wherein the graph has been normalized to the maximum amplitude of the graph of FIG. 9A.
Figure 9C:
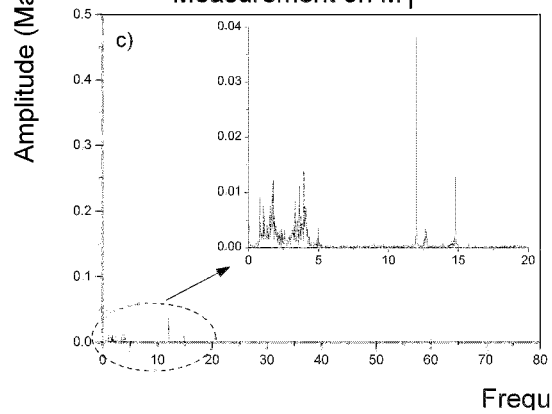
FIG. 9C is a graph showing a spectrum analysis of the frequencies that are present on a first suspension stage of an isolation system according to an embodiment of the present invention, wherein the graph has been normalized to the maximum amplitude of the graph of FIG. 9A.
Figure 9D:
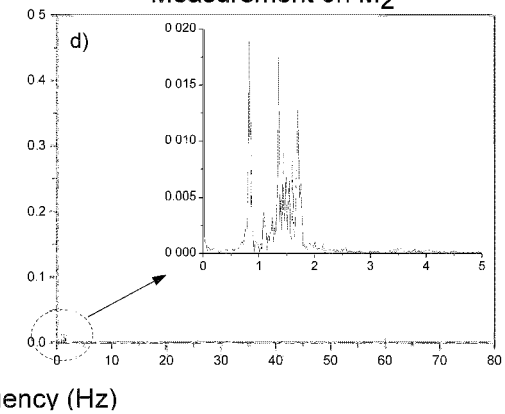
FIG. 9D is a graph showing a spectrum analysis of the frequencies that are present on a second suspension stage of an isolation system according to an embodiment of the present invention, wherein the graph has been normalized to the maximum amplitude of the graph of FIG. 9A.

The values of mass, spring constant and damping coefficient of the present isolation system are carefully selected to obtain the lowest possible frequency response. FIG. 9A shows a spectrum analysis of the frequencies that are present on the floor of a example laboratory, with the maximum amplitude on the floor being used to normalize all of the graphs of FIGS. 9B-9D. Seen in the graph are the frequencies between 0 Hz and 80 Hz with a large spike at approximately 17 Hz. FIGS. 9B, 9C, and 9D show the same measurements performed on the air table platform, first suspension stage, and second suspension stage, respectively. The main graphs are at the same scale as FIG. 9A, allowing for a direct comparison of the amplitude. FIGS. 9B-9D also contain insets which are individually scaled in order to most clearly show the vibrations present in each case. Each added stage further decreases the measured vibrations until on the second suspension stage only the natural frequencies of the three different stages are measurable. These three levels of isolation increase the slope of the drop-off to each side of f1 in the frequency response of the isolation system. When coupled with the high mechanical rigidity of the probe assembly (high f2), the combined frequency response is enough to effectively eliminate all signs of mechanical vibrations in measurements using a system of the present invention. Special care was taken in cable attachment so that additional vibrations were not transmitted to the probe.

Probe Alignment Assembly

To eliminate the complications associated with additional moving mechanical parts, and to reduce the overall size of a probe of the present invention (described above), a probe may utilize an external alignment process using a probe alignment assembly 60 such as that shown in FIGS. 10A-10E. The probe alignment assembly 60 is used to align a tip relative to a substrate prior to mounting a probe in a probe chamber or other platform. The objective tip-substrate alignment is to position the tip a few microns or sub-microns apart from the substrate so that the probe can then be transferred to a probe chamber or other platform. In the probe alignment assembly 60, a puck 64 of a probe 62 is plugged into a puck socket 66. A tip 68 is affixed (for example, glued, epoxied, soldered, etc.) to a tip holder 70 and mounted into a tip mount 72. The tip holder 70 may house a magnetic core piece 74, which is held against the surface of a pushing assembly 76 by a magnet 78. An insulating plate 79 may be provided between the pushing assembly and the tip holder 70. Once a tip holder 70 is properly positioned using the tip approach method described below, the tip holder 70 is affixed to the tip mount 72. Conductive glues, epoxies, or paint may be used in order to maintain a conductive path from the tip mount 72 to the tip 68. Such a probe alignment assembly 60 prevents movement of the tip 68 relative to the tip mount 72 during curing.

To position the tip holder 70 in the tip mount 72, the pushing assembly 76 includes a stepper motor 80 (or other appropriate actuator) to push the tip holder 70 relative to the substrate 82 of the probe 62. The stepper motor 80 may position the tip 68 relative to the substrate 82 to within a few microns. An optical microscope may be used to aid in this positioning. Once the tip 68 is positioned by way of the stepper motor 80 and pushing assembly 76, an automated tip approach method may be used to precisely align the tip 68 relative to the substrate 82 and thereby determine a desired final gap (which may be from a few micron to sub-microns, or even few nanometers). The automated tip approach method utilizes an automated electrical feedback approach based on measuring the electrical resistance between the tip 68 and the substrate 82.

Figure 11A:
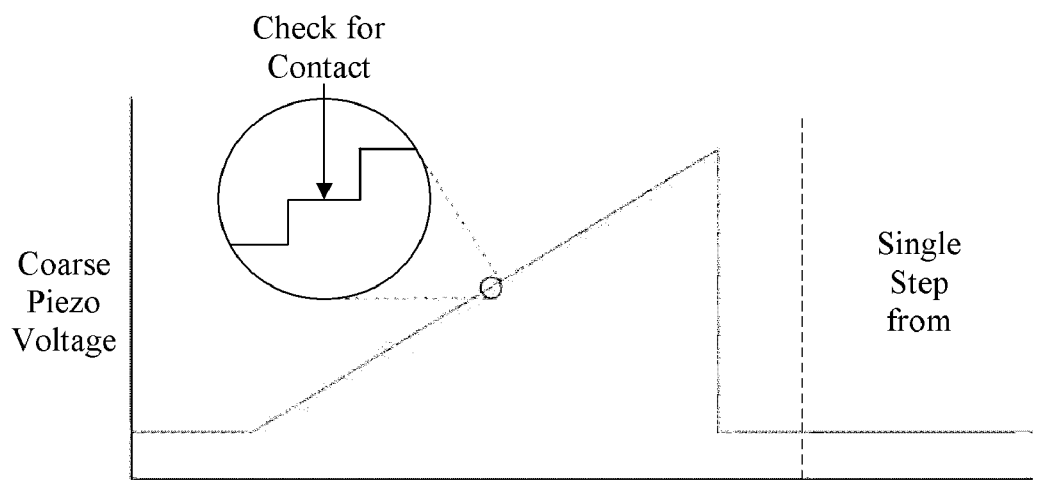
FIG. 11A depicts a tip approach methodology of the present disclosure.
Figure 11B:
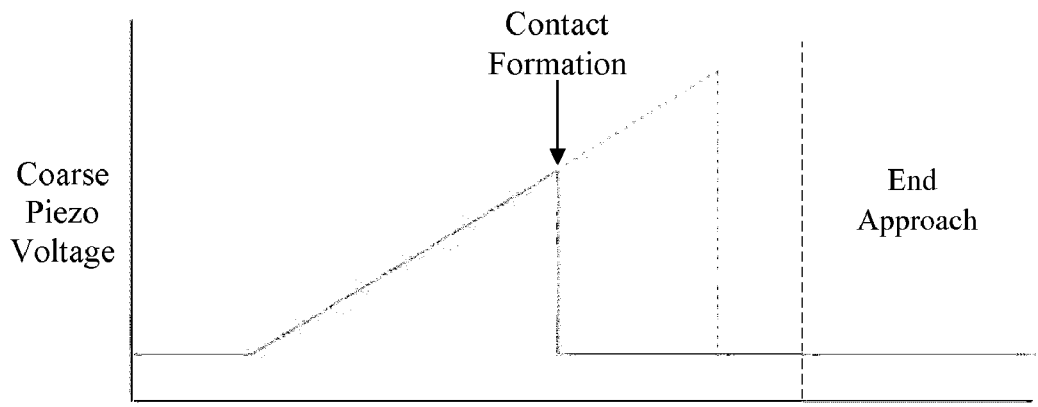
FIG. 11B depicts a tip approach methodology of the present disclosure, wherein a point contact has been formed.
Figure 12:
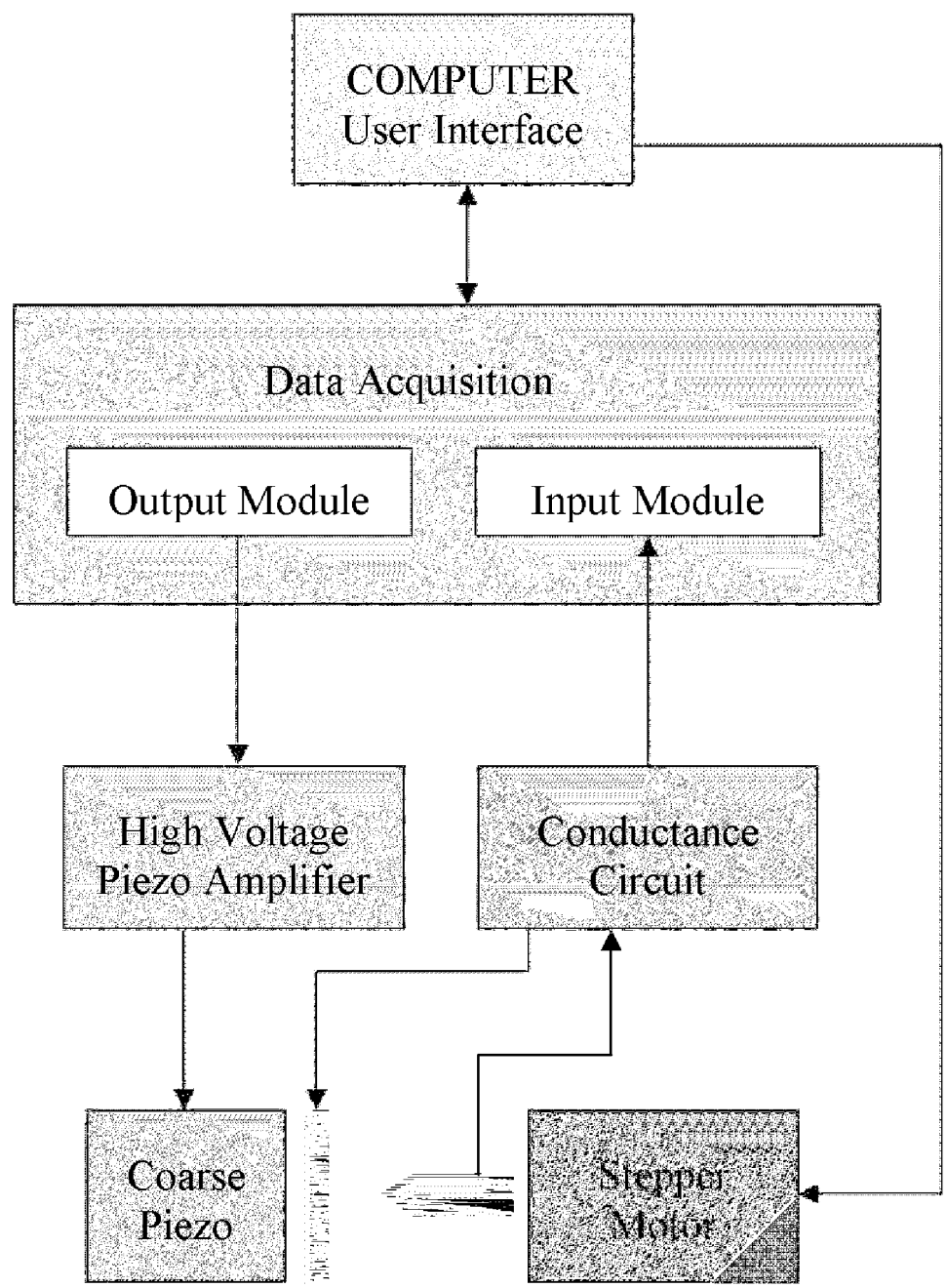
FIG. 12 is

An example methodology of the automated tip approach methodology is shown in FIGS. 11A-11B. The automated approach starts by slowly ramping the voltage to the coarse piezo in steps, shown in FIG. 11A. At each step a feedback system checks for measurable electrical resistance across the tip-substrate gap using tip alignment electronics such as those depicted in FIG. 12. If an air gap exists between the tip 68 and the substrate 82, the resistance is large—higher than the range of most meters. Once the coarse piezo has been stepped to a position where the tip-substrate gap is of the order of sub-nm or when the tip touches the substrate, the resistance becomes measurable. If the coarse piezo voltage reaches a maximum level with no contact, the coarse piezo voltage is reset to zero, the stepper motor 80 moves the pushing assembly 76 and thereby, the tip holder 70, forward by a step, and the coarse piezo voltage is ramped up in steps once again (again measuring electrical resistance after each step. Once a desired point contact is detected, the coarse piezo voltage is reset to zero, FIG. 11B, and the automated approach is completed. At this point the tip holder 70 is affixed to the tip mount 72. Once the tip holder 70 is affixed, the stepper motor 80 and pushing assembly 76 can be refracted, and the probe 62 can be withdrawn from the puck socket 66 of the probe alignment assembly 60. The probe 62 may then be used for measurement.

In this manner, the gap between the tip 68 and the substrate 82 is known based on the coarse piezo voltage used during alignment. This process allows precise separation of the tip 68 from the substrate 82, which can be quickly recovered during use of the probe 62 (e.g., in a probe chamber) by applying the same coarse piezo voltage to the coarse piezo. This method also allows the use of stepper motors de-linked from probes.

Figure 3A:
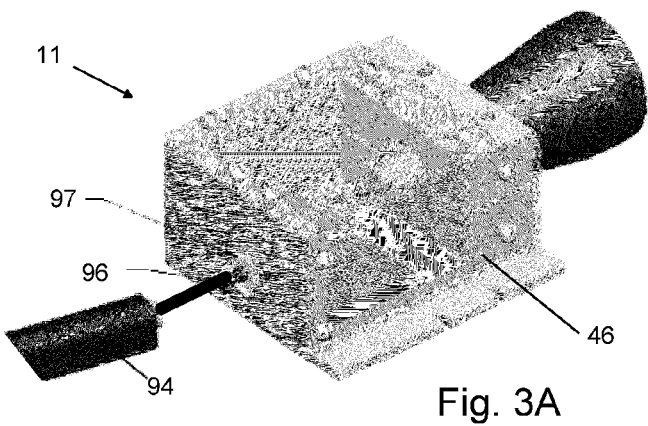
FIG. 3A is a perspective view of a probe having a cover according to another embodiment of the present invention.
Figure 3B:
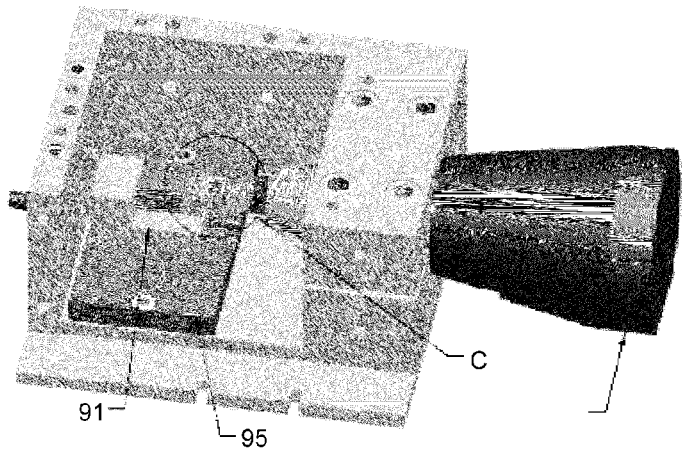
FIG. 3B is a perspective view of the probe of FIG. 3A without the cover.
Figure 3C:
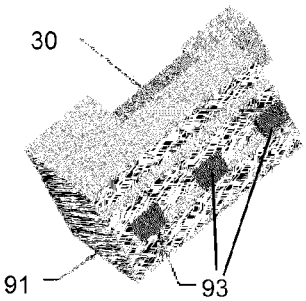
Figure 3D:
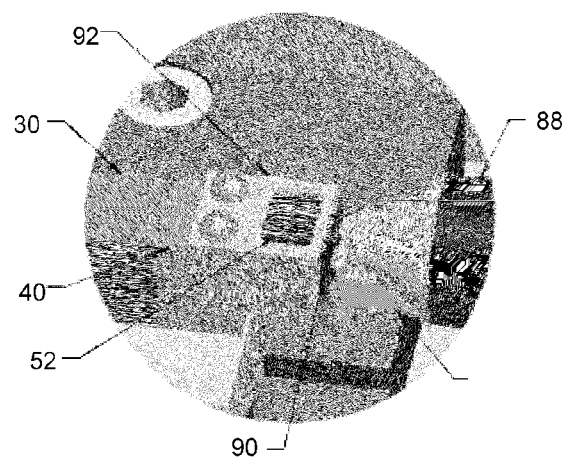
FIG. 3D is a detail view of the region labeled C of FIG. 3B.
Figure 3E:
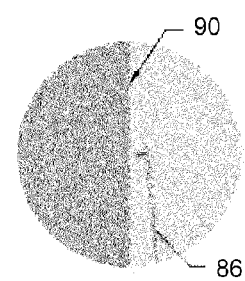
FIG. 3E is a detail view of the tip-substrate region of the probe of FIGS. 3A and 3B.

In another embodiment of a probe depicted in FIGS. 3A-3c, a magnetic alignment assembly 91 is provided. A tip 86 is mounted on a fine piezo 88. In this non-limiting example, the tip 86 is in the form of a cantilever, which is used to measure deflections and forces during deformation of the point contacts. A substrate 90 is mounted on a substrate holder 92. After mounting the substrate 90 and the tip 86, the magnetic probe alignment assembly 91 is pushed using a stepper motor 94. The stepper motor 94 is mounted through port 96 that may subsequently used for introduction of various gases during use of the probe 11 for measurement. The alignment assembly 91 is then pushed until the substrate 90 is at a preset position relative to the tip 86, which is monitored electronically as described above (through measurement of electrical resistance across the tip-substrate gap). The stepper motor 94 is then dismounted, and the probe 11 may then be used for measurements. The bottom isometric view of the alignment assembly 91 in FIG. 3C shows a set of magnets 93, which grip a magnetic plate 95 to secure the alignment assembly 91 into position once the stepper motor 94 is removed. A plug 97 may be inserted after removal of the stepper motor 94 to seal the probe chamber.

Figure 17:
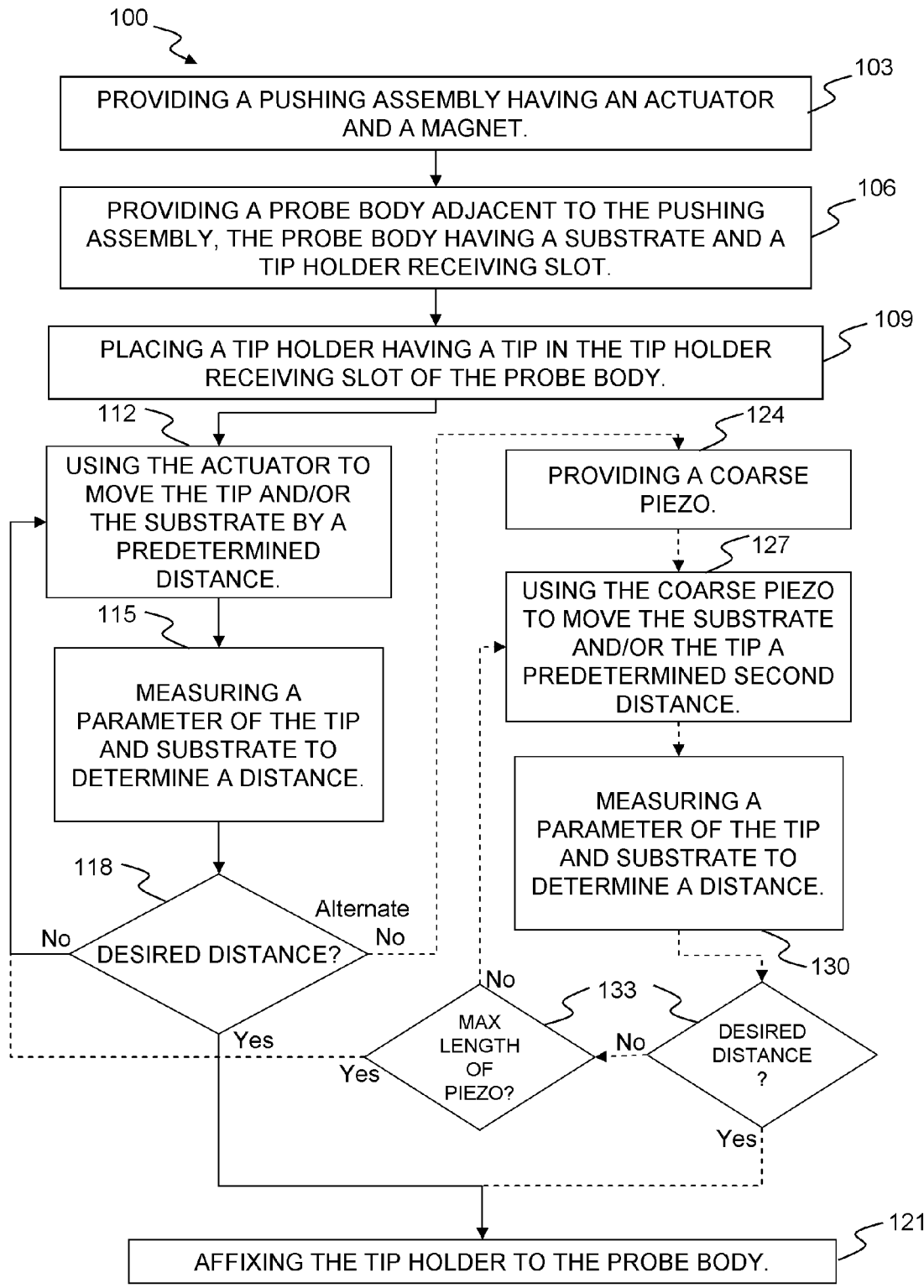
FIG. 17 is a flowchart depicting a method of configuring a metrology probe.

The present invention may be embodied as a method 100 of configuring a metrology probe (see, e.g., FIG. 17). The method 100 comprises the step of providing 103 a pushing assembly having an actuator and a magnet. The pushing assembly may be similar to that described above. A probe body is provided 106, the probe body being adjacent to the pushing assembly. The probe body includes a substrate and a tip mount such as, for example, the probe body depicted in FIG. 2A. A tip holder, having a tip affixed therein, is placed 109 in the tip mount of the probe body. The tip holder is placed such that the tip is proximate the substrate and the tip holder is held against the pushing assembly by the magnet of the pushing assembly. The tip holder may include a tip holder magnet configured to attract the magnet of the pushing assembly. The actuator is used 112 to move the tip toward the substrate by a predetermined distance. In a non-limiting example, in the case where the actuator is a stepper motor, the pushing assembly may push the tip by one step of the stepper motor. A parameter of the tip and substrate is measured 115 to determine a distance from the tip to the substrate. In a non-limiting example, the resistance (or conductance) may be measured between the tip and the substrate to determine whether an air gap exists and/or whether a point contact has been formed. The steps of using 112 the actuator to move the tip and measuring 115 the tip-substrate parameter are repeated 118 until a desired tip-substrate distance is determined. For example, the tip is stepped toward the substrate until measurements indicate that a point contact has been formed. Once the desired tip-substrate distance is determined, the tip holder is affixed 121 to the probe body. Through the use of such a pushing assembly and method, the actuator of the pushing assembly need not be located on the probe body, and, therefore, the probe body may be smaller and more stable in use.

In another embodiment, the method 100 may further comprise providing 124 a coarse piezo affixed to the probe body and configured to move the substrate and/or the tip relative to each other. For example, the coarse piezo may be configured to move the substrate toward the tip, the tip toward the substrate, or both. During a use 112 of the pushing assembly actuator (e.g., a step of a stepper motor) to move the tip holder, the coarse piezo is used 127 to move the substrate toward the tip (or tip toward the substrate or both) by a predetermined second distance. The predetermined second distance (a movement of the coarse piezo) may be less than the predetermined distance of the actuator such that the coarse piezo may be used to move the substrate and/or the tip closer relative to each other by an incremental distance between movements of the actuator. The tip-substrate parameter is measured 130 to determine the tip-substrate distance. The steps of using 127 the coarse piezo and measuring 130 the tip-substrate parameter are repeated 133 until a desired tip-substrate distance is determined or until the coarse piezo has reached a maximum range of motion (maximum usable length). In the case where the desired tip-substrate distance is achieved, the tip holder is affixed 121 to the probe body. In the case where the coarse piezo has reached a maximum range of motion, the coarse piezo length is reset and the actuator is used 112 to move the tip toward the substrate by the predetermined distance.

Data Acquisition, Real Time Control, Electronics, and Custom Software

Figure 13:
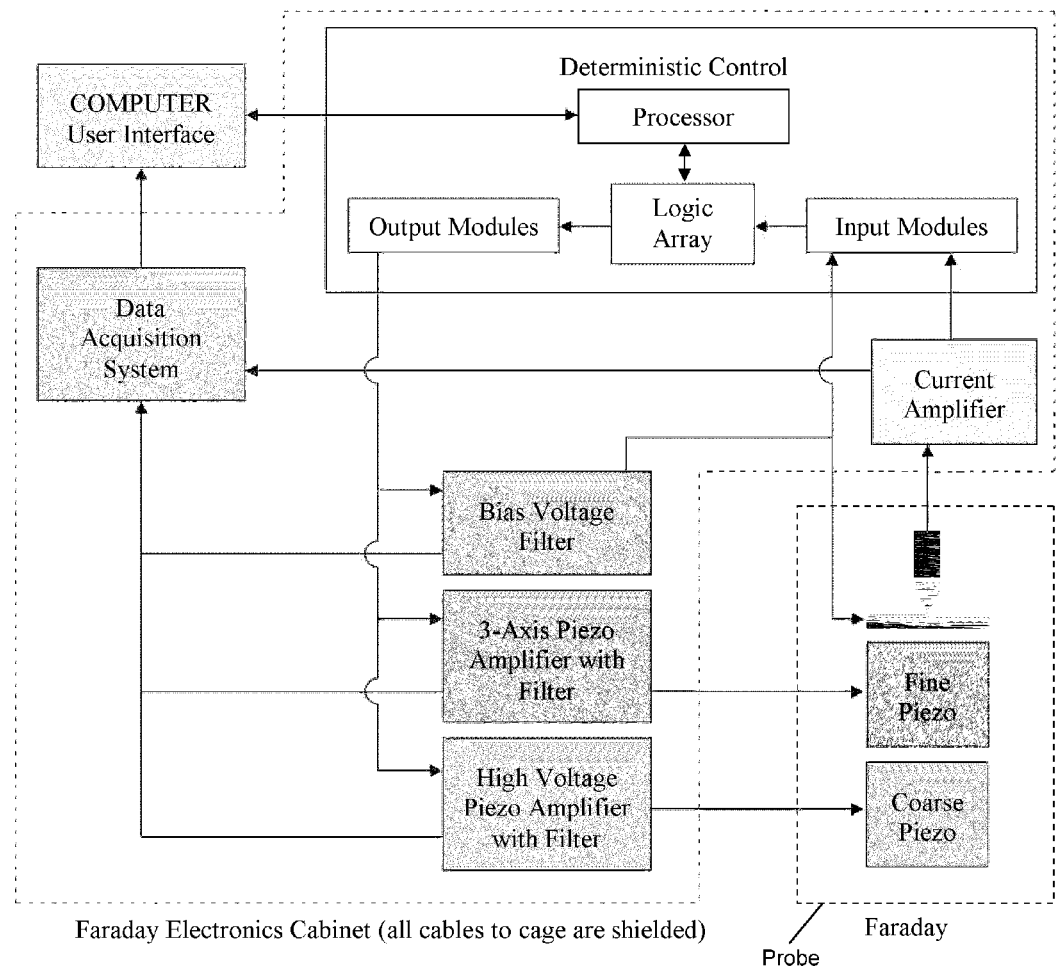
FIG. 13 is a schematic of one embodiment of a probe connected to a real-time data acquisition unit, deterministic control system, and driving electronics.
Figure 14:
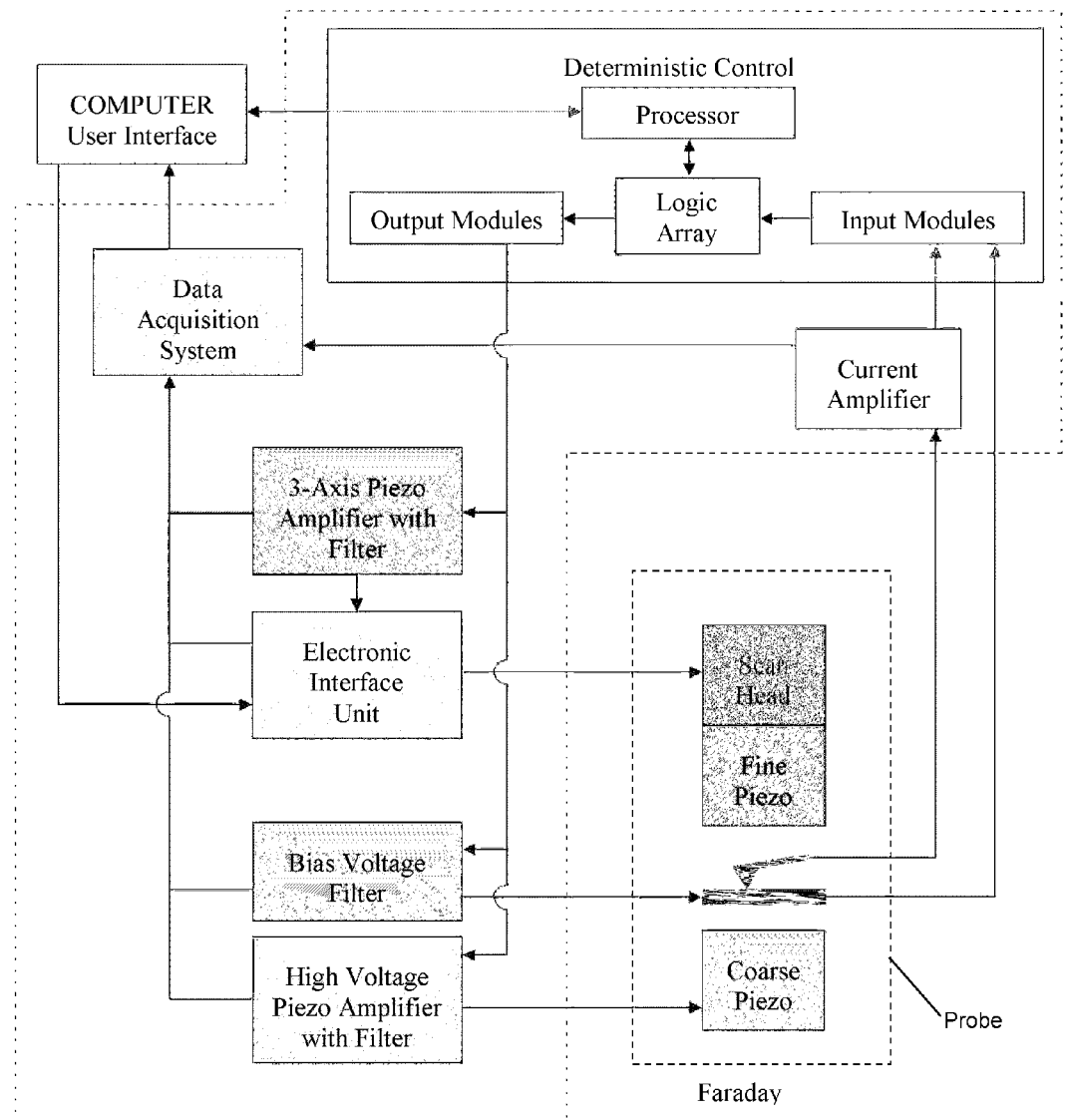
FIG. 14 is a schematic of another embodiment of a probe connected to a real-time data acquisition unit, deterministic control system, and driving electronics.
Figure 15:
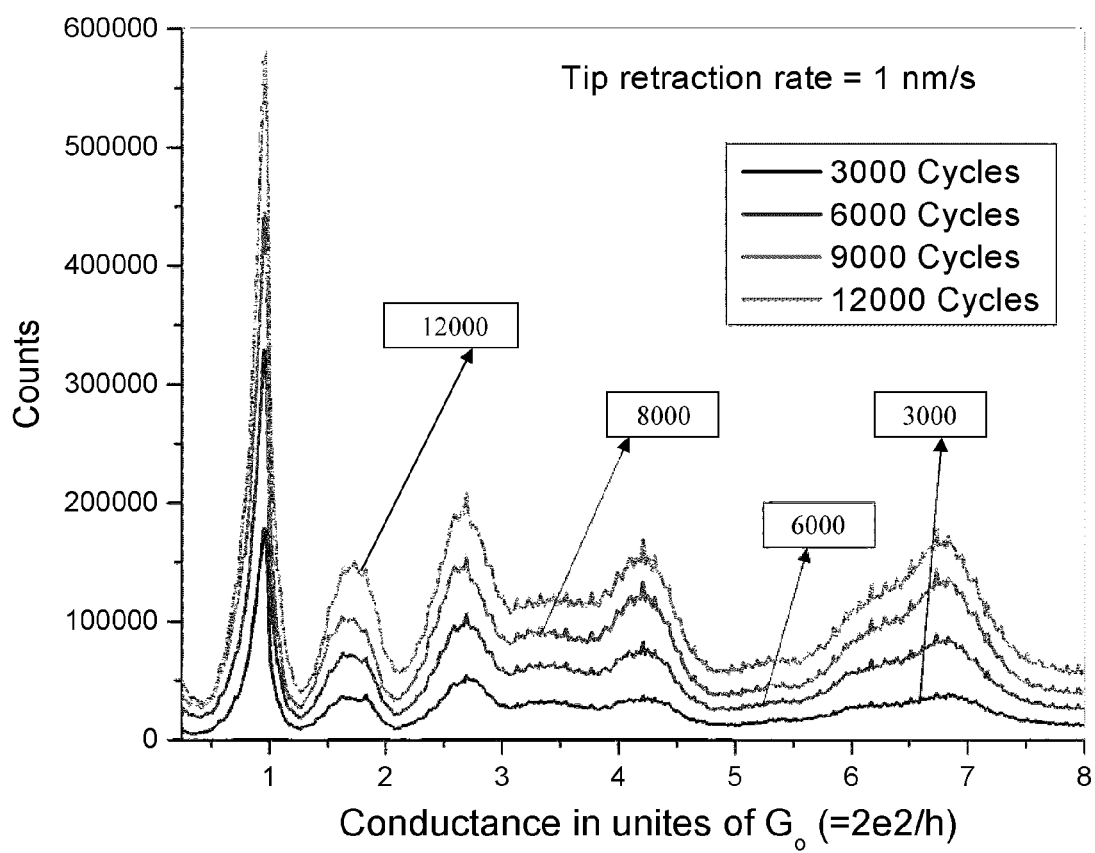
FIG. 15 is a graph showing conductance histograms at various retraction cycles with at tip retraction rate at 1 nm/s.
Figure 16:
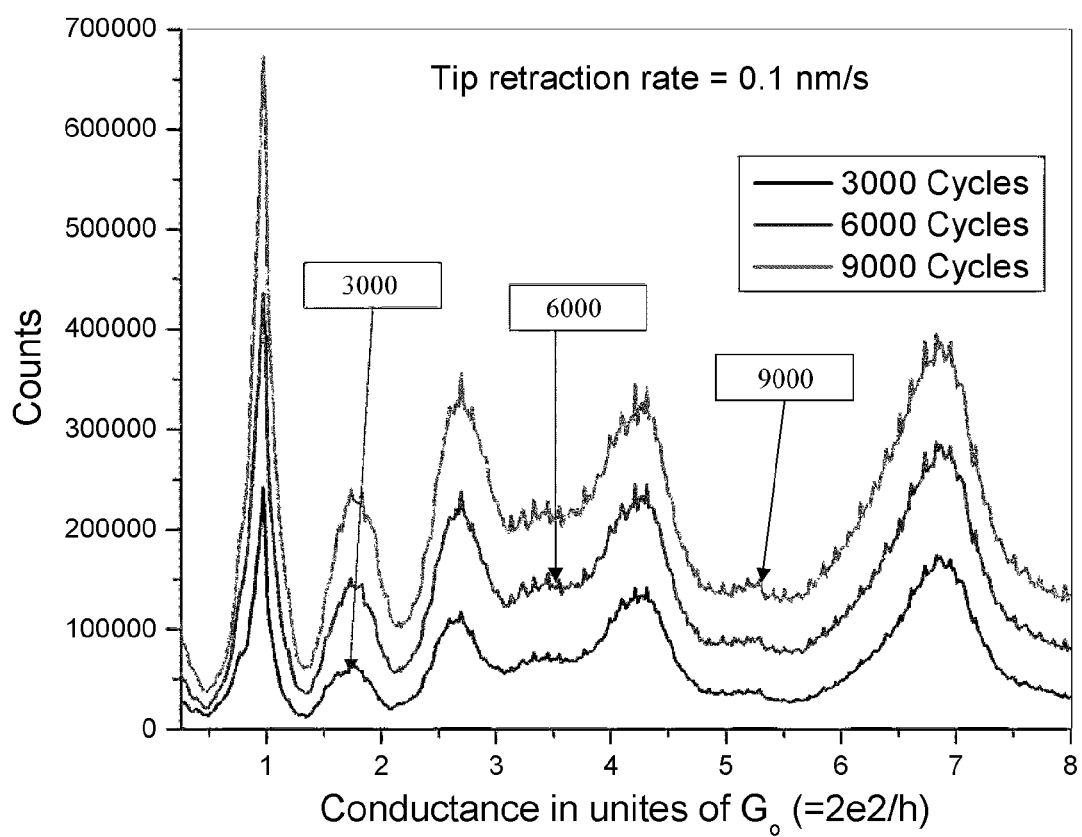
FIG. 16 is a graph showing conductance histograms at various retraction cycles with a tip retraction rate at 0.1 nm/s.

A system of the present invention is driven by a real-time data acquisition system and custom software for real-time data analysis. FIG. 13 depicts one embodiment of a probe 310 connected to a real-time data acquisition unit 320 and deterministic control system 330. FIG. 14 depicts another embodiment of a probe 410 connected to a real-time data acquisition unit 420 and a deterministic control system 420. The use of a real-time system interfaced with a computer provides a deterministic control loop for the execution of custom software having the need of running several loops. The custom software not only controls data acquisition and hardware control using custom routines, it also enables real-time processing, display, and archiving of acquired data into desired formats. For example, the software can calculate, plot, and save conductance histograms and noise analysis. Moreover, the system can create cumulative and individual files that can be accessed in real time. To illustrate, FIGS. 15 and 16 show conductance histograms of atomic sized gold point contacts by retracting the tip and 1 nm/s and 0.1 nm/s respectively. FIG. 15 shows the conductance histograms at the end of 3000, 6000, 9000, and 12,000 retraction cycles. Using the software of the present invention, any one of the 12,000 retraction cycle file can be accessed independently. Alternatively, a cumulative file at any given stage point can be accessed and plotted, as shown in FIGS. 15 and 16. The software can be made to execute cycles with variable retraction rates and approach rates for the tip and pre-assigned number of cycles at any given rate. The dynamical properties can be studied by inputting the software with pre-assigned amplitudes and frequencies at variable retraction or extension rates for the piezos.

Method for Measuring

Figure 18:
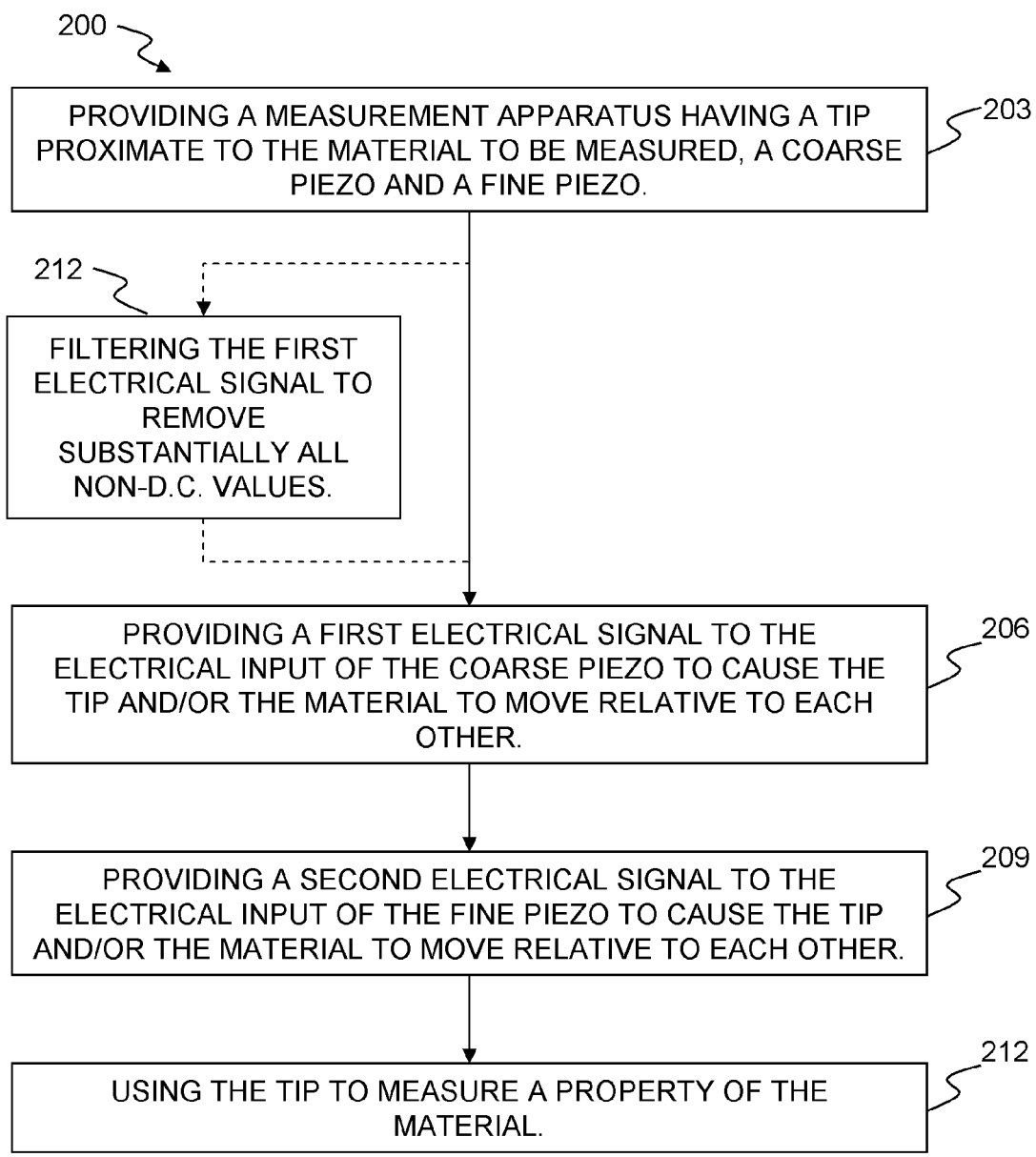
FIG. 18 is a flowchart depicting a method of measuring a property of a material.

The present invention may be embodied as a method 200 of measuring a physical property of a material (see, e.g., FIG. 18) comprising the step of providing 203 a measurement apparatus having a tip proximate to the material to be measured. The measurement apparatus may be a probe as described above having a coarse piezo and a fine piezo each with an electrical input and configured to cause the tip and/or the material to move relative to each other. A first electrical signal is provided 206 to the electrical input of the coarse piezo to cause the tip and/or the material to move relative to each other such that the tip and material are closer to each other. A second electrical signal is provided 209 to the electrical input of the fine piezo to cause the tip and/or the material to move relative to each other. The tip is used 212 to measure a property of the material. For example (but not limited to), the resistance or conductance between the tip and the material may be measured. In another non-limiting example, the second electrical signal may oscillate such that the elongation of the material may be measured. The first electrical signal may be filtered 215 to remove substantially all non-D.C. values from the signal. In this way, noise and signal drift will be substantially filtered out of the first electrical signal and the coarse piezo will provide a stable position of the tip.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:
1. A metrology probe, comprising:
(a) a probe body;
(b) a substrate connected to the probe body;
(c) a tip connected to the probe body and proximate to the substrate;
(d) a coarse piezoelectric actuator ("piezo") having a first electrical input and configured to cause a relative movement between the tip and the substrate when a first input signal is received by the first electrical input;
(e) a low-pass filter in electrical communication with the first electrical input and configured to selectively filter the first input signal; and
(f) a fine piezo having an electrical input and configured to cause a relative movement between the tip and the substrate when a second input signal is received by the second electrical input.

2. The metrology probe of claim 1 further comprising a retainer disposed on a top surface of the substrate for containing a liquid.

3. The metrology probe of claim 1 wherein:
the substrate is fixed relative to the probe body;
the tip is movable with respect to the probe body; and
the coarse and fine piezos are configured to move the tip in order to cause the tip and substrate to move relative to each other.

4. The metrology probe of claim 1 wherein:
the tip is fixed relative to the probe body;
the substrate is movable with respect to the probe body; and
the coarse and fine piezos are configured to move the substrate in order to cause the tip and substrate to move relative to each other.

5. The metrology probe of claim 1 wherein:
the tip is movable with respect to the probe body;
the substrate is movable with respect to the probe body; and
the coarse and fine piezos are configured to move the substrate and the tip in order to cause the tip and substrate to move relative to each other.

6. The metrology probe of claim 1, further comprising:
an isolation platform having a first spring with a first spring constant and a second spring having a second spring constant; the first and second springs suspending the isolation platform from a supporting apparatus; and
wherein the probe body is affixed to the isolation platform.

7. The metrology probe of claim 1, wherein a same change in the first and second input signals results in a movement caused by the coarse piezo which is greater than a movement caused by the fine piezo 8. The metrology probe of claim 1, wherein the tip is a cantilever tip.

9. The metrology probe of claim 8, wherein the tip is an atomic force microscope tip.

10. The metrology probe of claim 1, wherein the tip is a needle tip.

11. The metrology probe of claim 1, further comprising a tip holder; and wherein the tip is affixed to the tip holder.

12. The metrology probe of claim 1, wherein the second electrical signal varies over time and the fine piezo causes the distance between the tip and the substrate to vary.

13. The metrology probe of claim 1, further comprising a heating element for applying heat to the substrate.

14. The metrology probe of claim 1, further comprising a cooling element for cooling the substrate.

15. The metrology probe of claim 1, further comprising a magnet for applying a magnetic field to the substrate.

16. A metrology probe, comprising:
(a) a probe body;
(b) a substrate mount connected to the probe body and configured to secure a substrate holder ;

(c) a tip mount connected to the probe body and proximate to the substrate mount, wherein the tip mount is configured to secure a tip holder;

(d) coarse means for causing relative movement between the tip mount and the substrate mount when a first input signal is received at a first electrical input of the coarse means;

(e) a low-pass filter in electrical communication with the first electrical input of the coarse piezo and configured to selectively filter the first input signal; and (f) fine means for causing relative movement between the tip mount and the substrate mount when a second input signal is received at a second electrical input of the fine means.

17. The metrology probe of claim 16, wherein the coarse and fine means each comprise a piezo.

18. The metrology probe of claim 16, further comprising a substrate holder secured to the substrate mount and configured to secure a substrate.

19. The metrology probe of claim 16, further comprising a tip holder secured to the tip mount and configured to secure a tip.

20. A method of measuring a property of a material, comprising the steps of:

(a) providing a measurement apparatus having a tip proximate to the material to be measured; a coarse piezo having a first electrical input and configured to cause a relative movement between the tip and the substrate; and a fine piezo having an second electrical input and configured to cause a relative movement between the tip and the substrate;

(b) providing a first electrical signal to the first electrical input to cause the tip and/or the material to move relative to each other;

(c) providing a second electrical signal to the second electrical input to cause the tip and/or the material to move relative to each other; and (d) using the tip to measure a property of the material.

21. The method of claim 20, wherein the property is selected from the group consisting of conductance, elongation, force, and resistance.

22. The method of claim 20, further comprising the step of filtering the first electrical signal to remove substantially all non-D.C. values.

23. The method of claim 20, wherein the provided tip is a cantilever tip and using the tip to measure a property of the material further comprises reflecting a laser off of the cantilever tip to measure a deflection of the cantilever tip.

24. A method of configuring a metrology probe, comprising the steps of:

(a) providing a pushing assembly having an actuator and a magnet;

(b) providing a probe body adjacent to the pushing assembly, the probe body having a substrate and a tip mount;

(c) placing a tip holder having a tip in the tip mount of the probe body wherein the tip is proximate the substrate and the tip holder is held against the pushing assembly by the magnet;

(d) using the actuator to move the tip toward the substrate by a predetermined distance;

(e) measuring a parameter of the tip and substrate to determine a distance from the tip to the substrate;

(f) repeating steps (d) and (e) until a desired distance is determined; and (g) affixing the tip holder to the tip mount.

25. The method of claim 24, further comprising the steps of:

(a) providing a coarse piezo configured to move the substrate relative to the tip;

(b) for each predetermined distance the tip is moved by the actuator, using the coarse piezo to move the substrate a predetermined second distance toward the tip wherein the predetermined second distance is less than the predetermined distance;

(c) measuring a parameter of the tip and substrate to determine a distance from the tip to the substrate; and (d) repeating steps (b) and (c) until either a desired distance is determined or the coarse piezo has reached a maximum usable length.

26. The method of claim 25, further comprising the step of resetting the coarse piezo to a beginning configuration.

27. The method of claim 24, wherein the actuator of the provided pushing assembly is a stepper motor.

28. The method of claim 24 wherein the parameter is electrical resistance between the tip and the substrate.

* * * * *